United States Patent
Schlueter et al.

(10) Patent No.: US 7,194,338 B2
(45) Date of Patent: Mar. 20, 2007

(54) VOLTAGE COLLAPSE DIAGNOSTIC AND ATC SYSTEM

(75) Inventors: Robert Schlueter, Holt, MI (US); Benjamin Ashton Minshall, Mason, MI (US); Ryan Joseph Hunt, East Lansing, MI (US)

(73) Assignee: Intellicon, Inc., Holt, MI (US)

( * ) Notice: Subject to any disclaimer, the term of this patent is extended or adjusted under 35 U.S.C. 154(b) by 314 days.

(21) Appl. No.: 10/879,236

(22) Filed: Jun. 28, 2004

(65) Prior Publication Data
US 2005/0033480 A1  Feb. 10, 2005

Related U.S. Application Data

(60) Provisional application No. 60/483,244, filed on Jun. 27, 2003.

(51) Int. Cl.
G05D 11/00 (2006.01)

(52) U.S. Cl. ............... 700/286; 700/292; 700/293; 307/18; 307/19; 323/205

(58) Field of Classification Search ........ 700/286, 700/292–293, 295; 307/140, 85–87, 18, 307/19; 323/205
See application file for complete search history.

(56) References Cited

U.S. PATENT DOCUMENTS

| | | | | |
|---|---|---|---|---|
| 5,594,659 A | * | 1/1997 | Schlueter | 700/286 |
| 5,610,834 A | * | 3/1997 | Schlueter | 700/293 |
| 5,745,368 A | * | 4/1998 | Ejebe et al. | 702/164 |
| 5,796,628 A | * | 8/1998 | Chiang et al. | 700/295 |
| 6,496,757 B1 | * | 12/2002 | Flueck et al. | 700/292 |
| 6,625,520 B1 | * | 9/2003 | Chen et al. | 700/286 |
| 2004/0158417 A1 | * | 8/2004 | Bonet | 702/57 |

OTHER PUBLICATIONS

Aumuller, Craig et al—"Analysis and Assessment of Large Scale Power System Voltage Stability by a Novel Sensitivity Based Method"—2002, IEEE.*
S. Liu and R. Schlueter "Structure of an Improved Intelligent Control for a Power System in a Deregulated Environment", Sep. 15-18, 1996, pp. 456-461.

(Continued)

Primary Examiner—Leo Picard
Assistant Examiner—Alexander Kosowski
(74) Attorney, Agent, or Firm—Young Basile Hanlon Macfarlane & Helmholdt P.C.

(57) ABSTRACT

An analysis method for an electrical power system whereby the plurality of buses are grouped into agents, family lines of agents and families of agents based on the reactive reserves depleted when the buses are loaded. Contingencies are then applied to the electrical power system. The reactive reserves are monitored, and an exhaustion factor is determined for one or more family lines in one or more families. A boundary case solution is used to assess where, why, and how the contingency causes voltage instability, voltage collapse and/or local blackout. Based on this information, the design of voltage rescheduling, active rescheduling, unit commitment, load shedding, etc., is determined that can be used as preventive, corrective or emergency controls in applications such as system design and planning, operation planning, reactive and voltage management, real time control and Special Protection System Control. Based on this information, solutions can then be applied to the power system.

43 Claims, 6 Drawing Sheets

OTHER PUBLICATIONS

Adriana S. Quintela and Carlos A. Castro: "Improved Branch-based Voltage Stability Proximity Indices Part II: Application in Security Analysis", Jul. 26, 2002, pp. 115-119.

Ismail Musirin and Titik Khawa Abdul Rahman: "On-Line Voltage Stability Based Contingency Ranking Using Fast Voltage Stability Index (FVSI)", Oct. 6-10, 2002, pp. 1118-1123.

Han Li and Y. H. Song: "Identification of Weak Busbars in Large Scale Power System" Oct. 10-13, 2002, pp. 1700-1704.

Xiaokang Xu, Martin W. Gustafson, Baldwin P. Lam, John D. Mountford and Sandra L. Johnson: Assessment of Voltage Stability and Real and Reactive Margins Using Advanced Analytical Tools, Oct. 13, 2002, pp. 2047-2051.

M. M. Othman, A. Mohamed A Hussen: "Available Transfer Capability Assessment of the Malaysian Power System", Jul. 16, 2002, pp. 184-187.

Yun-Fa Chan, Chia-Chi Chu and Sheng-Huei Lee: "Optimal Strategy to Split Firm and Recallable Available Transfer Capability in the Deregulated Environment", Oct. 6, 2002, pp. 881-885.

Y. Ou and C. Singh: "Calculation of risk and statistical indices associated with available transfer capability", Feb. 6, 2003, pp. 239-244.

International Search Report and Written Opinion for International Application No. PCT/US2004/02093.

* cited by examiner

VOLTAGE COLLAPSE DIAGNOSTIC AND ATC SYSTEM

RELATED APPLICATIONS

This application claims the benefit of U.S. Provisional application Ser. No. 60/483,244 filed Jun. 27, 2003.

TECHNICAL FIELD

This invention relates generally to system design and planning, scheduling operation, real time control, and protection of electrical power systems, and more particularly, this invention relates to a method for performing an assessment of when the electrical power system fails to supply customers or comes close to failing to supply power to customers due to voltage collapse, local blackout, or voltage instability. The method uses the cascading structure of the system to search and find contingencies that cause failure.

BACKGROUND

A number of problems can arise when outages occur within an electrical power system. One kind of problem, called voltage collapse, is a cascading loss of stability in subsystems caused by an equipment outage or increased load, which can in turn overload additional power system components. Voltage collapse can also be caused by an equipment outage due to relaying actions, failure of equipment or failure of control. Voltage collapse generally leads to a blackout or brownout where customers are no longer provided with the power they desire. Another type of voltage problem, called loss of voltage stability, is the inability of the generation, transmission and distribution system to supply enough power to satisfy customer demand after a disturbance, increased load or a change in operating conditions without an uncontrollable and progressive decrease in voltage. The source of these instability problems is within and between components in the electrical power system that delivers electrical power to customers. A third problem, called local blackout, occurs when the power network is pushed to its physical limits. This phenomenon can be caused by numerous factors, some of which are 1) exhaustion or depletion of reactive supply in the voltage control or reactive supply devices serving the local region or 2) outages of equipment or 3) increased power flow into or within a local region.

In an attempt to prevent voltage instability, methods have been developed that are directed toward identifying and rectifying weaknesses in the electrical power system before those weaknesses result in voltage instability. One such method is disclosed in U.S. Pat. No. 5,594,659 ('659 patent) entitled Method for Performing a Voltage Stability Security Assessment for a Power Transmission System.

While the '659 patent does provide a method directed toward identifying weak subsystems that evidence coherent behavior for the electrical power system, some drawbacks exist. Specifically, the '659 methods are intended to solely assess proximity to voltage instability in a coherent subsystem of a high voltage portion i.e. transmission level of a power network. The proximity measures developed in '659 are not intended to assess the vulnerability to voltage collapse or local blackout; or more importantly, to determine when the network has experienced voltage collapse and local blackout. The '659 patent does not address the structure within the transmission, sub-transmission and distribution networks required to produce sequential exhaustion of reactive reserves, sequential instability, voltage collapse, or local blackout or inability to obtain a loadflow solution. The '659 patent does not address a "divide and conquer" method of selecting contingencies that cause sequential exhaustion of reactive reserves, cascading instability, voltage collapse, or local blackout or that have no loadflow solution. In a preferred embodiment of the present invention, the Voltage Collapse Diagnostic, Preventive, Corrective and Emergency Control, and Available Transfer Capability described in this patent capture the structure needed to produce sequential exhaustion of reserves, sequential instability, voltage collapse, or local blackout or produce conditions that a loadflow has no solution. The present invention was developed in light of these and other drawbacks associated with the '659 methodology.

SUMMARY

The present invention provides an analysis method for an electrical power system whereby a plurality of buses are grouped into agents, family lines of agents, and families of agents based on the reactive reserves depleted when the buses are loaded to a predetermined load. Simulated single contingencies are then applied to the electrical power system, and the reactive reserves are monitored. An exhaustion factor is determined for each set of one or more agents. The present invention, in one aspect, seeks single outages (bus-branch or breaker-node) that have no solution and then single outages that in combination produce double outages that have no loadflow solution. The present invention attempts to find loadflow solutions by removing the equipment associated with the outage in small steps and finds outages that have a solution but are close to voltage collapse or local blackout. The process of removing equipment in small steps rather than removing it in one step is to find the family lines of agents in one or more families that could experience voltage collapse or local blackout and the Predicted Control Region that is composed of those agents that are impacted by an outage.

Based on this information, Preventive (before the outage occurs), Corrective (actions that arrest the blackout without disconnection of equipment or load) and Emergency Controls (actions that arrest the blackout and include disconnection of equipment or load) are developed to obtain solutions to the load flow equations that attempt to track and ameliorate the sequential impacts on family lines of agents and the agents in the Predicted Control Region. A different Preventive, Corrective and Emergency Control would reverse the sequential impacts or terminate the sequential impact within family lines and the Predicted Control Region. These controls include unit commitment, voltage rescheduling and/or active power rescheduling of generators in the Predicted Control Region and/or load shedding. (Emergency Control) on buses in load bearing agents(load pockets) in the Predicted Control Region.

An Available Transfer Capability is an active power constraint that indicates when the system has too much power being imported into a load bearing agent or the control region used to arrest blackouts after single and double outages. The Voltage Collapse Diagnostic and Preventive Control indicates the single and single outage components of double outages that could cause blackout for any control region, the control region agents where Preventive Control is possibly preventing the blackouts for these outages, and the maximum amount of power that can be imported into the control region without causing blackout for any of the single equipment outages, which is the Total Transfer Capability for the control region. All of the above including the control region, the outages, and how power can be imported to improve or reduce reliability in the control region, are all obtained from the Voltage Collapse and Preventive Control. If Total Transfer Capability is less than the power imported into the control region plus two reliability margins, then load must be reduced via preventive load shedding or a combination of Preventive Voltage Rescheduling, Preventive Active Rescheduling and Preventive Load Shedding Controls. The Available Transfer Capability can be used to produce or modify Unit Commitment, Active Power Scheduling, Voltage and Reactive Scheduling, Real Time Control, Special Protection System Control to prevent or arrest voltage collapse, local blackout or voltage instability.

DETAILED DESCRIPTION

Figure 1:
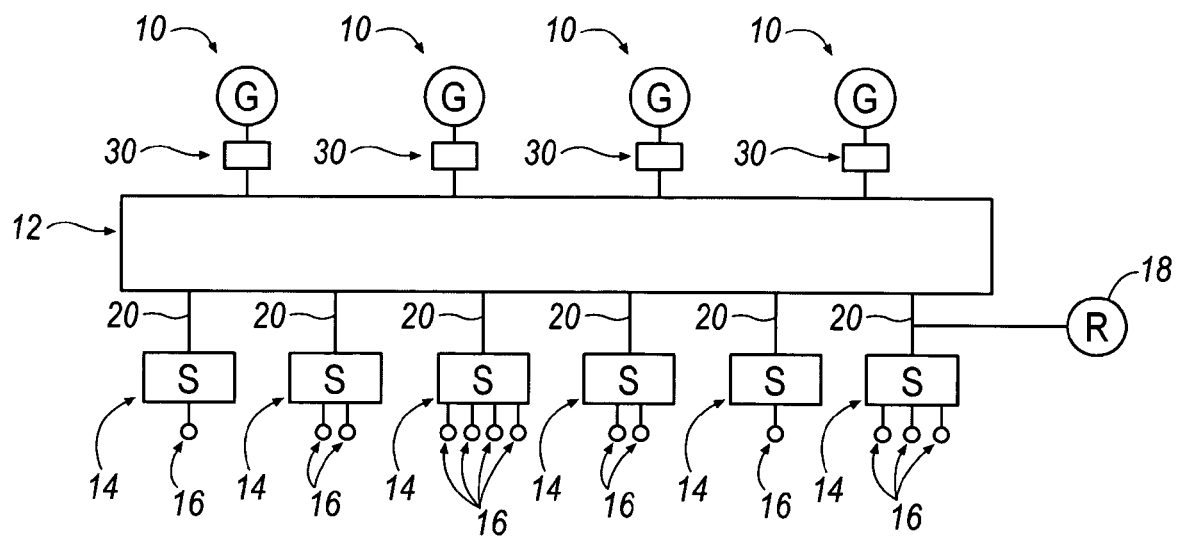
FIG. 1 is a schematic view of electrical power system according to an aspect of the present invention.

Referring now to FIG. 1, a schematic view of a conventional electrical power system is shown and described. The electrical power system shown in FIG. 1 generally includes generators 10, transmission system 12, substations 14 and 30, and load centers 16. It should be understood that the electrical power system shown in FIG. 1 is a non-limiting example, and that the present invention may be applied to numerous different configurations from that shown in FIG. 1.

The generators 10 can be any known electrical generation source such as coal, nuclear, gas or other types of generators. The generators 10 transmit generated electrical power to substations 30, which in turn, step up the voltage of the transmitted electrical power to a voltage sufficient for transporting power across the transmission system 12.

The transmission system 12 is a network of high voltage electrical wires designed to transmit the electrical power from generators 10 across great distances to substations 14. The substations 14 represent connections to the sub-transmission and/or distribution network. The sub-transmission and distribution network include substations for connecting buses at different voltage levels and provide paths for power to flow to customers in the load centers 16 of the distribution and sub-transmission networks. The load centers 16 represent end users of electrical power, such as homes, factories, businesses or the like. It should be noted many different configurations may be used to step electrical power up or down, such as multiple substations, or to transport electrical power across the transmission system 12. Additionally, as mentioned above, many different configurations of the electrical power system from that described herein may be employed in conjunction with the present invention, and the example shown in FIG. 1 is provided merely for purposes of clarity and illustration.

Figure 2:
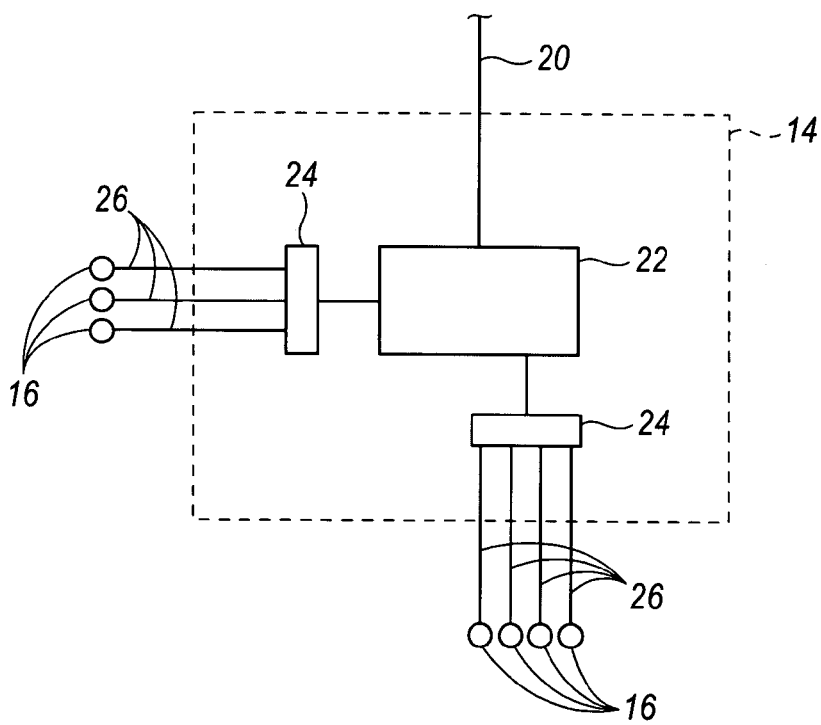
FIG. 2 is a schematic view of a portion of an electrical power system according to an aspect of the present invention.

The transmission system 12, substations 14 and every other component between the load centers 16 and the generators 10 include a plurality of buses that provide electrical connection between various components of the electrical power system. By way of a non-limiting example, as shown in FIG. 2, buses 24 are shown as providing an electrical connection between power lines 20 coming from the transmission system 12, sub-transmission system, and/or distribution system to power lines 26 that distribute power through transmission, sub-transmission, and local distribution networks at the same or lower voltage. Specifically, power lines 20 supply higher voltage electricity into substation 14, which is stepped down to a lower voltage by transformer 22. Buses 24 provide a connection for the electrical power to be distributed on a distribution network represented by power lines 26. It should be understood that FIG. 2 is one non-limiting example of the usage of buses in the electrical power system, and that buses are used at numerous locations throughout an electrical power system for distribution of electrical power. For example, buses may be located at the generators 10 themselves, at different points along the transmission system 12, at the substations 14 and 16 and at every other part of the electrical power system. Accordingly, for purposes of this application, the term buses are used in conjunction with a connector that connects one electrical component with another for the purpose of transporting electrical power.

Reactive reserves are positioned at different points along the electrical power system. By way of a non-limiting example, reserves 18 are shown in FIG. 1 as being connected between substation 14 and transmission system 12. The reserves 18 may be a bank of capacitors, generator or other known power source or voltage control/reactive supply device. The reserves 18 provide an additional power source to assist the electric power system during times of unusually high or low power usage. In addition to the reserves 18, it should be understood that any one of or a combination of generators 10 may serve as a reactive supply device. Specifically, scheduling of increased output of any of the generators 10 may be used to provide additional active and reactive power into electrical power system in particularly stressed parts of the system.

The present invention is based, in part, on the idea that voltage collapse, local blackout or instability is a function of the impact of contingencies on lower voltage levels, such as within the sub-transmission system, distribution network, or near load centers. The present invention also recognizes that voltage collapse, local blackout or instability is caused not only by catastrophic outages, but is often the result of combined minor fluctuations of geographically widespread reactive reserves and generators that combine to cause cascading exhaustion of reactive supply and possible voltage instability of agents due to outages. Often, generators are scheduled to be connected and to produce reactive power via voltage schedules, and active power at certain levels over a set of agents in one or family lines either have very little reactive supply capability or are inadvertently scheduled (voltage, reactive and active power schedules) to have very little reactive reserves, which can make the system vulnerable to cascading instability that can be catastrophic. Most outages that have no loadflow solution and cause voltage instability, voltage collapse or local blackout either cause exhaustion of reactive reserves in agents that can cause instability of the agents or exploit the fact that there are little or no reactive reserves in agents and in family lines. Based on the scheduling of units that are in service, voltage set-point schedules on voltage control/reactive supply devices, active power schedules on generators, load patterns, and flows of active and reactive power, one can experience voltage instability, voltage collapse, or local blackout.

Voltage instability, voltage collapse or local blackout is addressed by a divide and conquer method of selecting components of double outages that each affect one or several different family lines of agents by initiating a sequential or cascading exhaustion of reactive supply in agents of these specific family lines in one or more families that synergistically cause voltage collapse or local blackout that is far worse that the sum of the effects of either outage. The two outages often do not most significantly reduce the reactive reserves of the same agents, the agents in the same family lines, or even agents and family lines in the same families and thus the resulting combination causes very unanticipated and extremely significant exhaustion of reactive reserves in more than one family line of agents in more than one family. The vulnerability of the system to a particular double outage is a combination of the selection of outages that produce large reactive losses in agents compared to the reactive reserves available in those agents by design or by scheduling of units, voltage and reactive power, active power, etc.

Accordingly, the present invention provides a method of identifying specific regions within the electrical power system that are particularly vulnerable to electrical outages and that may cause cascading exhaustion of reactive supply outages. In one embodiment, this method applies specific simulations of electrical outages to a model of an electrical power system under examination. The method according to the present invention groups buses and generators within the model into specific groupings called "agents" and then tests the effect of simulated outages (called contingencies) on these agents. The resulting effects on the agents are then assessed according to severity before and after simulated outages. From this information, system weaknesses can be determined and proposals as to load shedding, active power rescheduling or voltage rescheduling can be made to operators of the electrical power system to prevent possible voltage electrical outages, local blackout or voltage instability.

Figure 3:
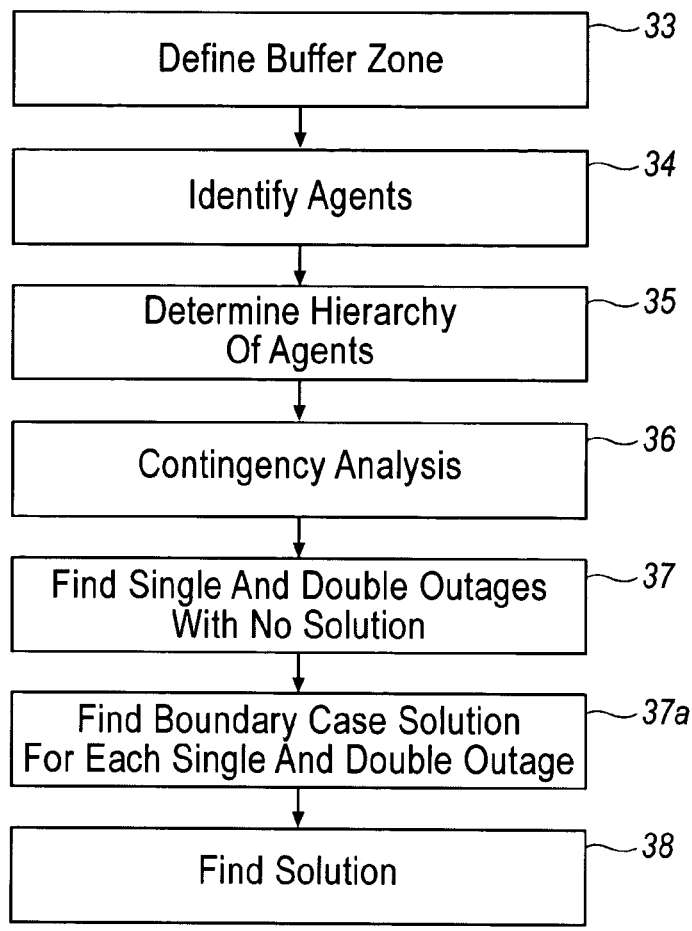
FIG. 3 is a flow chart depicting an operation of a voltage collapse and diagnosis procedure according to an aspect of the present invention.

One embodiment of the process according to the present invention is shown in FIG. 3. Here, the process begins at step 33, where a region of interest is specified, and a buffer zone surrounding the region of interest is identified. In a preferred embodiment of the invention, the selected buffer zone surrounding the region of interest or the region of interest itself is a region of buses that is sufficiently deep to include lower voltage level buses such as those at or below 34 KV. One skilled in the art will readily recognize other maximum values for the lowest levels retained in the model. The lower voltage level buses preferably include load bearing buses as well as non-load bearing buses. Load bearing buses are buses that directly connect portions of the electrical power system to real loads such as industrial plants, homes or other power consuming entities or that carry load in the loadflow model of the actual system. Non-load bearing buses are buses that simply act as a transfer point for electrical power within the electrical power system.

Additionally, the buffer zone is preferably selected to be sufficiently large to account for cascading exhaustion of reactive reserves that extend across many directions in the electrical power system. More specifically, the inventors of the present invention have determined that two or more components dispersed within an electrical power system may interact with one another even if the two or more components are located far from one another. Therefore, the buffer zone is preferably selected such that it does not preclude components in the electrical power system simply because they are geographically dispersed. Accordingly, the buffer zone is selected such that it encompasses as many of these interrelated components as possible.

Next, in step 34, groups of buses and reactive reserves within the selected buffer zone are grouped into "agents." Each agent represents a selected grouping of buses that are supported by a specific set of reactive reserves. The term reactive reserves is any power source or voltage control/reactive supply device in the electrical power system, such as generators 10 or reserves 18 that is capable of providing reactive power. In step 35, the agents determined in step 34 are organized in a hierarchy based on the specific generators that support the specific buses in each agent. The group of buses in an agent defines its voltage instability region. Next, in step 36, a contingency analysis is performed. The contingency analysis in step 36 includes simulating outages on the electrical power system and monitoring the reactions of the generators 10 at each agent or in groups of one or more of the agents. The term contingency or outages is used to indicate taking an electrical component, such as a generator, power line or other component off-line.

The above-described process is a simulation based on applying artificial loads to a computer model of the selected area within the electrical power system. Preferably, the model, to which the outages are applied, accurately represents the electrical characteristics of specific components in the electrical power system. In step 37, the effects of contingencies on agents or groups of one or more agents are assessed according to the magnitude to which their reactive reserves are exhausted to find equipment outages that have sufficient impact or no loadflow solution or are close to having no loadflow solution. In step 38, results from the contingency analysis and grouping of agents are used to identify specific remedial actions or modifications that may be made to the electrical actual power system to prevent voltage collapse, local blackout, or voltage instability in response to the contingency.

Figure 4:
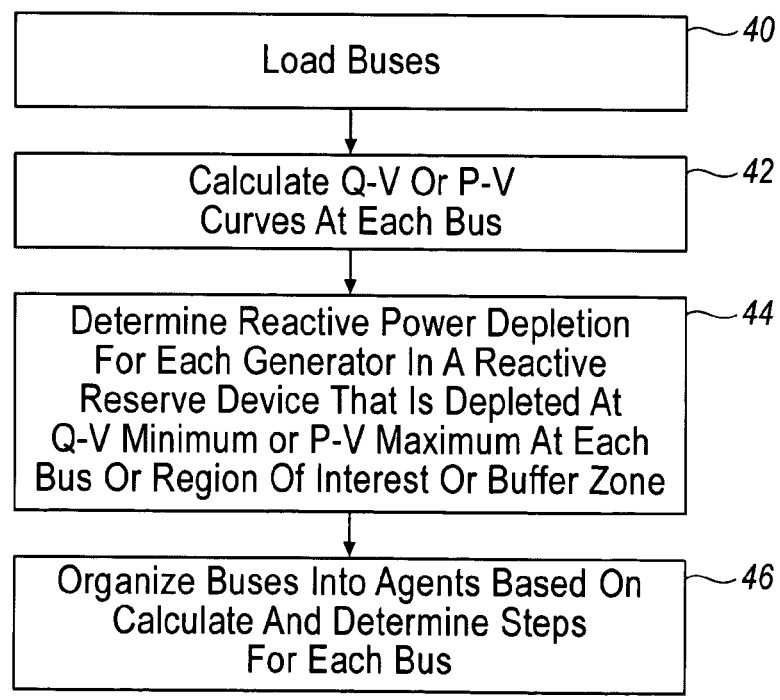
FIG. 4 is a flow chart depicting an operation of a voltage collapse and diagnosis procedure according to an aspect of the present invention.
Figure 5:
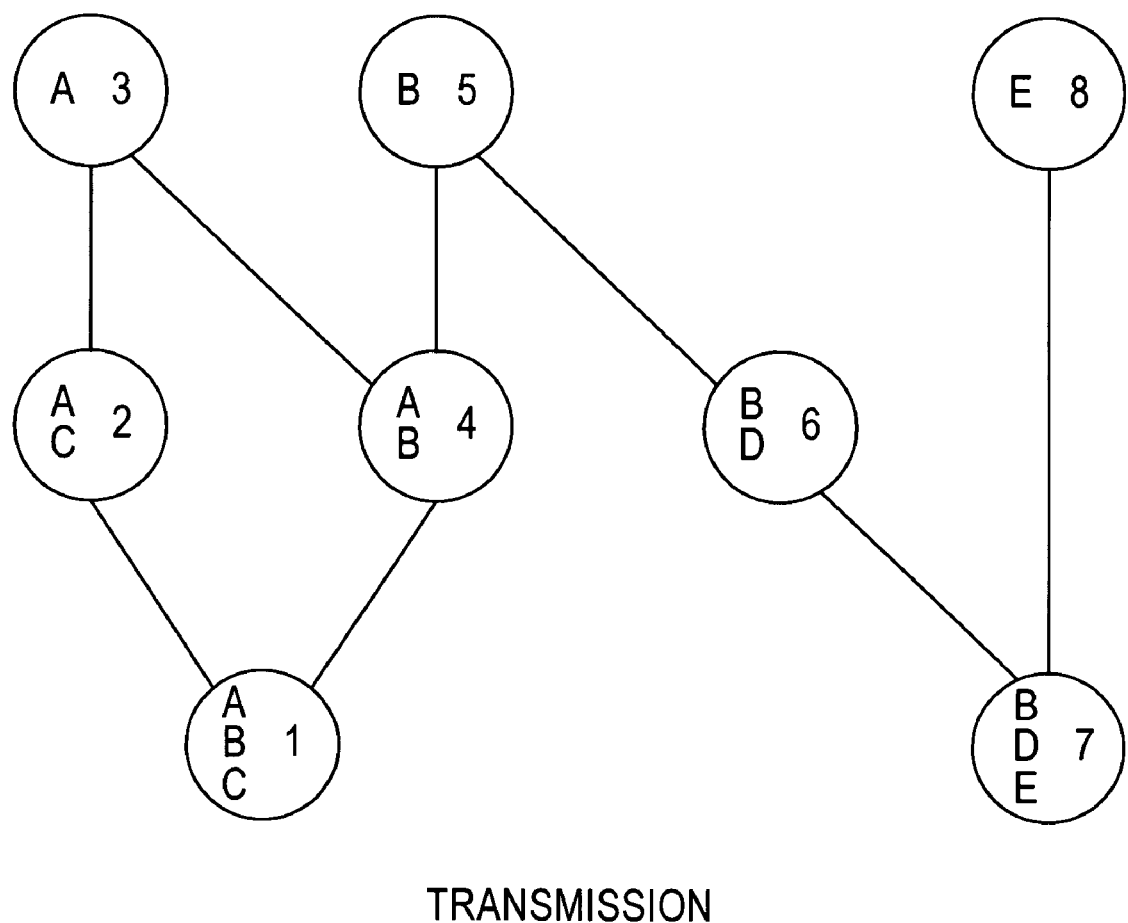
FIG. 5 is a schematic view of an agent hierarchy diagrammed according to an aspect of the present invention.

Referring now to FIGS. 3, 4 and 5, the above described process is explained in greater detail. In FIG. 4, the agent selection process, identified in step 34 of FIG. 3, is described. The agent selection process begins with step 40 where simulated electrical loads are applied to each of the buses in the model of the electrical power system. The buses include not only buses 24 (see FIG. 2), but any other bus within the selected region of interest and buffer zone that provide electrical connection between different components in the electrical power system for purposes of transporting electrical power. The simulated loads are preferably applied in an incremental manner to allow for the mathematical computation of an artificial loading curve (i.e., a Q-V (reactive power loading), S-V (apparent power loading), or P-V (active power loading) curve) for each incremental load setting. A preferred implementation is to compute a Q-V curve at every bus in the region of interest and buffer zone since this curve is computed by adding a fictitious generator of unlimited reactive generation and absorption capability at the bus where the stress in applied and thus is more likely to obtain solutions to the load flow equations near the boundary of the operating region where voltage instability, voltage collapse or local blackout occur. The Q-V curve is computed by changing the bus model to a generator model, expanding the reactive supply and absorption reactive limits, and incrementally reducing voltage until the first reactive power absorption minimum is found or until the load flow has no solution. The buses where the maximum load terminal point is due to lack of a load flow solution are often in load bearing agents and often in load bearing agents where load shedding is effective in obtaining solutions after equipment outage impact the reactive reserves in these load bearing agents. This terminal point of the artificial loading curve is defined as the point of maximum load for a specific bus and represents a point on the boundary of the operating region where voltage collapse, voltage instability or local blackout would occur. In step 42, artificial loading curves are calculated, and the point of maximum load is determined for each bus in the region of interest and in the buffer zone. Alternative means well known to those skilled in the art may also be used to find the point of maximum load for each bus.

In step 44, the specific reactive reserves, such as generators 10 or reserves 18, that are completely depleted at the point of maximum load are identified for each bus. The reactive reserves identified in this step represent the specific power sources that expend all of their resources to meet the increasing load on each artificially loaded bus. The reactive reserves identified in this step may also be referred to as the reactive reserves for the specific loaded bus.

In step 46, the buses having the same reactive reserves are grouped together into specific agents. By this way, each agent represents a specific set of buses, where each bus of the agent completely depletes the identical generator 10, groups of generators 10, or reserves 18 when artificially loaded to the point of maximum load. In conjunction with the discussion above, each bus in the agent's voltage instability region has identical reactive reserves and thus the reactive reserves for the agent are defined as this same set. The reactive reserves represent the generators 10 or other voltage control/reactive supply devices that deplete their resources to meet an increasing load on the group of buses of the voltage instability region of the agent.

Referring now to FIG. 5, the hierarchy analysis in step 35 of FIG. 3 is described in greater detail. FIG. 5 shows all of the identified agents as being organized into a hierarchy according to the specific generators 10 or other power sources that act as the reactive reserves for each particular agent. The lower level agents on the hierarchy chain, proximate the load bearing centers, are agents having generators 10 that are subsets of their parent agents (agents closer to the transmission level). The agents typically fall into an organization that begins at a lower voltage level proximate the load bearing centers and extends to a higher voltage level at the transmission level. This organization results from the fact that higher voltage level agents closer to the transmission level are supported by more reactive reserves. Agents may also fall into an organization that represents the electrical remoteness from the generators 10 relative to their reactive supply.

The organization of agents into a hierarchy as shown in FIG. 5 provides the ability to identify family lines of agents or buses that are supported by the same reactive reserves. A family line is a child, parent, grandparent, etc. A family is composed of several family lines of agents with the same patriarchal parent. The vulnerability region of a family of agents or of a specific patriarchal agent associated with this family is the collection of the voltage instability regions of all agents in all family lines of the family including the patriarchal agent or highest agent in the hierarchy. A P-V curve computed by scaling active load at every bus in every agent in every family line of the vulnerability region of a patriarchal agent generally exhausts the reactive supply of the patriarchal agent of the family. Further, computing a Q-V curve at any bus in the voltage instability region of that patriarchal agent by adding reactive power load in the voltage instability region of each patriarchal agent determines the exhaustion of the reactive reserve in sequence of agents in all family lines of the family associated with that patriarchal agent and possible sequential instability in each agent in each family line in the family. Exhausting the reactive supply of a child will generally cause the reactive supply of the generators belonging to the parent, but not necessarily the child, to exhaust their reactive supply. The generators belonging to a grandparent of that child that do not belong to the parent may also exhaust their reactive supply. The scaling of active power load at all buses in the vulnerability region of a patriarchal agent causes the exhaustion of reactive reserve in each family line of the family associated with the patriarchal agent in the same manner as just described, but possibly in a different sequence although structurally for the same reasons of accessibility of reactive supply of parents with respect to their children.

Simulating equipment outages by removing equipment in small steps (similar to a dimmer switch) will exhaust the reactive reserves and presumably cause voltage instability in one or more family lines in one or more families with the exception that the reserves in all family lines in any particular family will not necessarily exhaust unless the outage is severe enough. If the outage is severe enough to exhaust the reactive reserves of the patriarchal agent and thus all family lines of the family, this exhaustion (which may be referred to as a sequential exhaustion, can proceed into ancestral agents and affect a region larger than the vulnerability region of the patriarchal agent). An outage can affect more than one family in this way. The exhaustion of reserves of agents in a family line and in families, and presumably the cascading instability of agents, affects how contingency selection, how Preventive, Corrective, and Emergency Control is determined and how Available Transfer Capability for a Control Region is calculated. By this way, one can identify groups or families of buses that are affected by the same reactive reserves or generators. More specifically, critical regions otherwise known as vulnerability regions, control regions and load pockets may be identified based on a number of agents in depth and width on the tree that deplete the same reactive reserves. The application of vulnerability regions and load pockets will be described in greater detail hereinafter.

In the illustration of FIG. 5, agents 1–8 are shown having generators 10, which are labeled A–E, as their reactive reserve zones. As shown in FIG. 5, agent 1 (proximate the transmission level) has generators A–C as its reactive reserve zone. Agents 2 and 4 have generators A, C and A, B, respectively, which are subsets of generators A–C of agent 1, as their reactive reserve zones. As the reactive reserve zones for agents 2 and 4 are subsets of the reactive reserve zone for agent 1, agents 2 and 4 are children of the parent agent 1. Accordingly, agents 2 and 4 are positioned as shown in the FIG. as children of the parent agent 1. Similarly, agent 3 is a child of agents 2 and 4 as agent 3 has generator A as a reactive reserve that is a subset of the reactive reserves of agents 2 and 4. Agent 5 is a child of agent 4 and has generator B as its reactive reserve zone and is therefore a subset of the reactive reserve of agent 4. Note a family line is the set of agents 1,2,3; 1,4,5: 1,4,3; 7,6,5; and 7,8, as well as portions of these family lines identified. Families of agents are composed of all family lines of agents connected to the agent. A family for agent 1 is agents 1, 2, 3, 4, 5 that include the agent 1. A family for agent 4 is agent 4, 3, 5. The exhaustion of reactive reserves for an agent implies exhaustion of reactive reserves for its family of agents and possible voltage instability for every agent in the family.

It should be noted that any parent may have generators in its reserves that are not in any of its children but this is not shown in the example. The principles of family lines experiencing cascading instability as agents in a family line with an increasing number of generators 10 and reserves 18 exhausting their reactive reserves carries over to the case that agents can have generators 10 or reserves 18 not in any of their children. The exhaustion of reactive reserves in any agent will generally cause exhaustion of reserves on the generators 10 and reserves 18 of the parent that do not belong to any child. Thus, this structure provides an explanation of the natural cascading exhaustion of reserves of agents and the cascading voltage instability of agents that would likely occur. The remaining agents 6–8 are organized in the same fashion as will be readily recognized by the skilled artisan.

The hierarchy organizational scheme as described above allows one to determine the specific impact that a particular generator has on a group of buses. For example, as can be seen in FIG. 5, generator A is part of the reactive reserve zone for agents 1–4. Generator B is part of the reactive reserve zone for agents 1 and 4–7. Therefore, one will readily understand that because generators A and B appear in the reactive reserves of many agents, they have a significant impact on the electrical power system as defined in FIG. 5.

Next, a contingency analysis is performed. This is represented by step 36 in FIG. 3. It should be understood, however, that the specific order of steps outlined above does not necessarily need to be followed. For example, the step of determining the hierarchy and organizational scheme may be performed after the contingency analysis.

The contingency analysis in step 36 of FIG. 3 is further described with reference to FIG. 7a. In step 130 in FIG. 7a, a single contingency analysis is first performed. Each specific single contingency is identified within the region of interest as discussed above and includes single generators, single transformers and single power lines. In step 132, the contingencies are simulated as taken off-line in the model of the electrical power system. In step 133, single contingency events with that fail to solve are stored for later processing. In step 134, for each solved, single contingency, the impact or exhaustive factor on the reactive reserves of each agent or each set of N agents is determined. The exhaustion factor can be computed agent by agent and then the reactive reserves remaining after the outage in specific agents can be used to determine if its percentage is small enough on a set of N agents. This calculation is easier than evaluation of the reactive reserves on all set of N agents for all N. Specifically, the amount of power output from each generator 10 or other reactive reserve 18, caused by the contingency, is calculated by solving the load flow equations.

Figure 6:
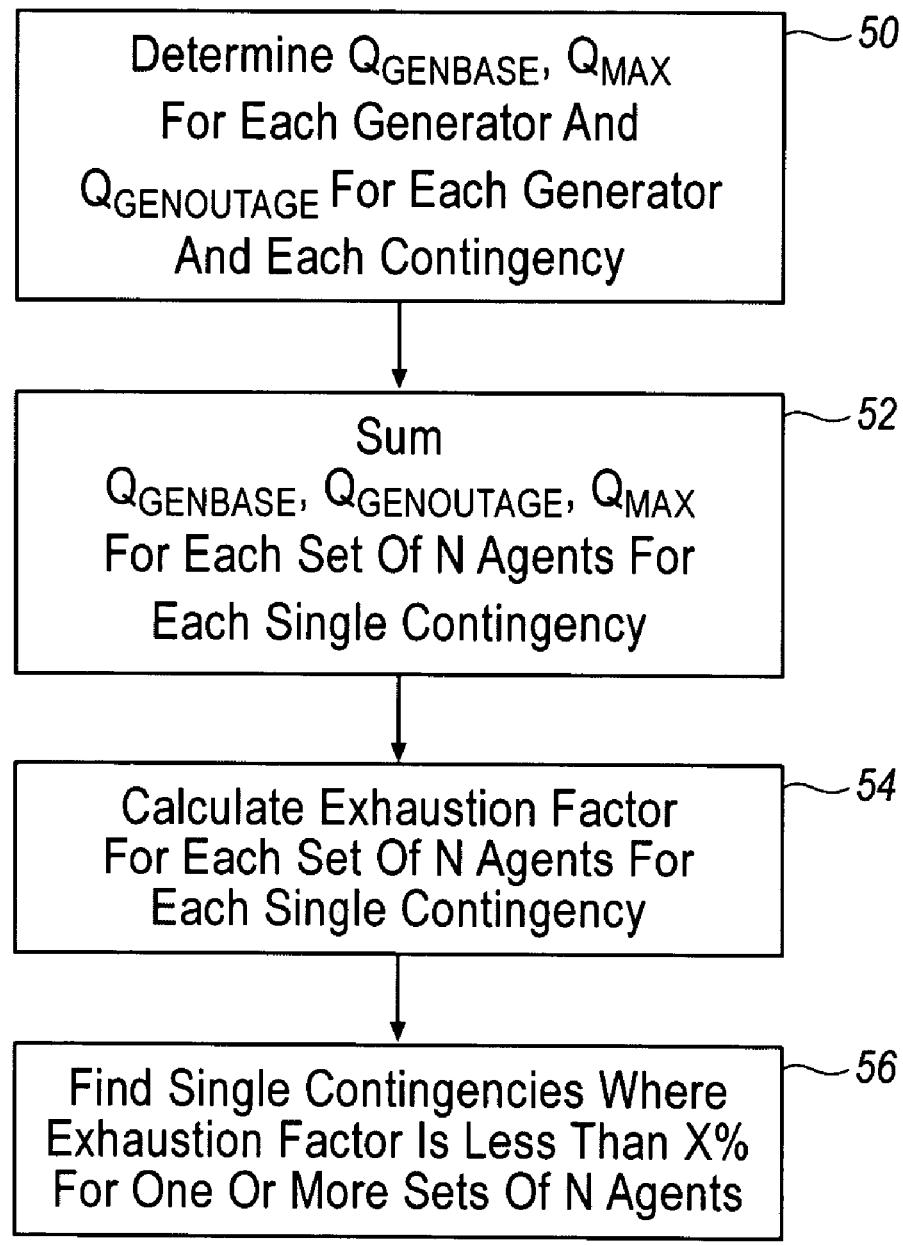
FIG. 6 is a flow chart depicting an exhaustion calculation for agents according to an aspect of the present invention.

The process depicted in FIG. 6 for computing the exhaustion factor begins with step 50, where Qgenbase, Qgenoutage, and Qmax are determined. Qgenbase is the base reactive power output of a particular generator 10 or reactive reserve 18. This base reactive power output represents the amount of reactive power that a generator 10 or reactive reserve 18 outputs when no contingency or outage is simulated. Qgenoutage is the reactive power output from a generator 10 or reactive reserve 18 in response to the contingency as described in step 36 above. More specifically, Qgenoutage represents the amount of reactive power output of the generator 10 or reactive reserve 18 in response to a specific contingency. Qmax is the maximum reactive power output that a generator 10 or reactive reserve 18 is capable of producing.

In step 52, Qgenbase and Qmax are summed for generators 10 and reserves 18 for each agent; and, Qgenoutage is summed for each agent for each contingency. This is performed by identifying the specific reactive reserves of a particular agent and summing the relevant values of all the reactive reserves for the agents together. In the illustration of FIG. 5, Qgenbase, Qgenoutage, and Qmax are summed for each of the agents 1–8. For example, agent 1 includes generators A–C. Therefore, Qgenbase, Qgenoutage, and Qmax of each of these specific generators are summed to result in one value for each of Qgenbase and Qmax for that agent as well as one value of Qgenoutage for each agent for each contingency.

In step 54, exhaustion factors are calculated for each of the agents. The exhaustion factor is determined according to equation 1 below.

$$\text{Exhaustion} = \left(\frac{Q\text{max} - Q\text{genOutage}}{Q\text{max} - Q\text{genBase}}\right) \cdot 100 \qquad \text{Eq. 1}$$

The exhaustion factor represents the percentage output that the reactive reserves for a particular agent have remaining after being required to provide reactive power in response to the contingency. For example, an exhaustion factor of 0% indicates that the reactive reserves for a particular agent were required to expend all of their reactive power resources in response to the contingency and are unable to provide any further reactive power output. Likewise, an exhaustion factor of 100% represents that reactive reserves for the agent were not required to expend any additional reactive power in response to the contingency. A second alternative exhaustion factor for each agent is the one computed in equation 1 times the reactive power change in MVARS at the generators 10 and reserves 18 for each agent. Other exhaustion factors could be used as will be recognized by the skilled artisan. The exhaustion factors are computed on an agent basis and not on all set of N agents for all N due to the difficulty in computation.

Once the exhaustion factor is determined as described with reference to FIG. 6, a multiple contingency analysis is performed. The multiple contingency analysis is directed toward contingencies that may individually pose an unacceptable drain on the reactive reserves, like in combination with other contingencies, may create a potential risk for voltage collapse, local blackout or voltage instability.

Figure 7A:
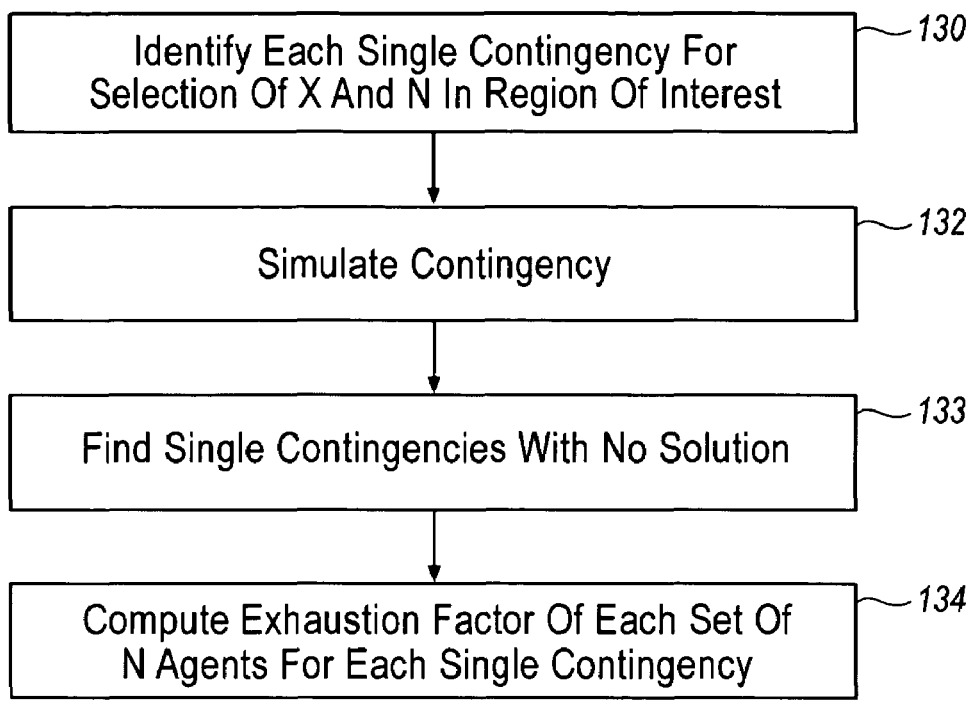
FIG. 7a is a flow chart depicting an operation of a voltage collapse and diagnosis procedure according to an aspect of the present invention.
Figure 7B:
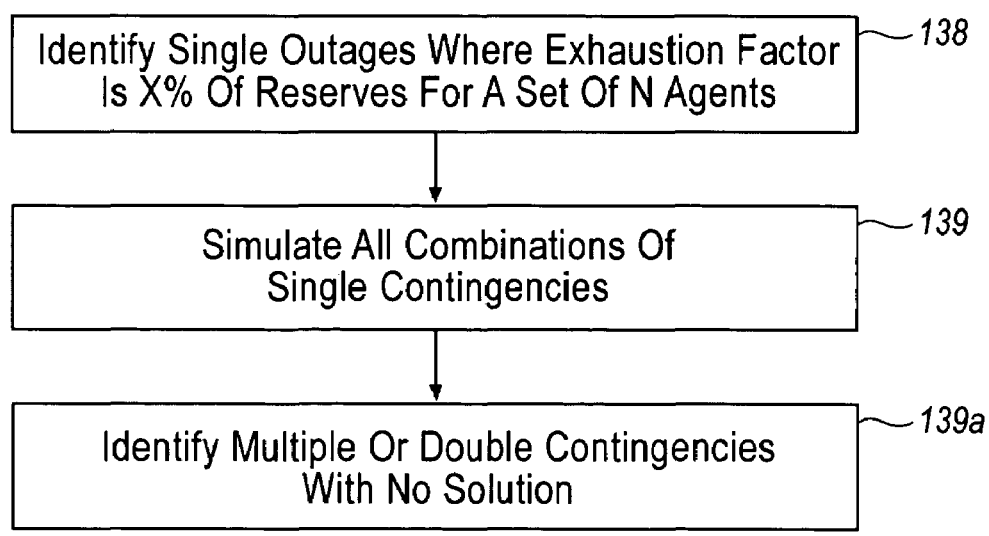
FIG. 7b is a flow chart depicting an operation of a voltage collapse and diagnosis procedure according to an aspect of the present invention.
Figure 7C:
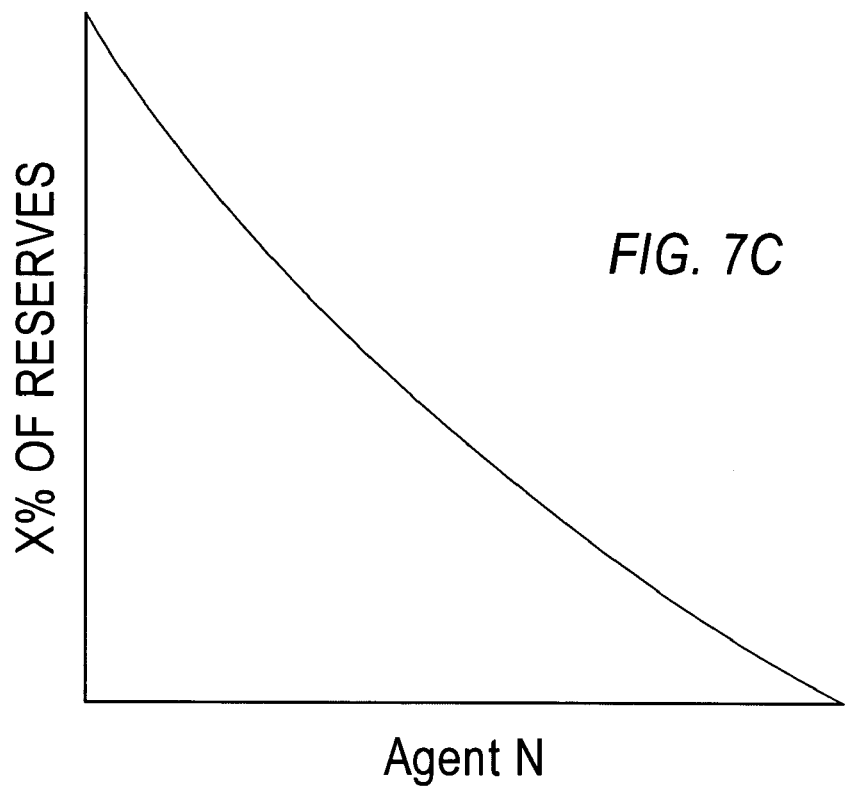
FIG. 7c is a graphical view of a selection algorithm for a number of agents and exhaustion percentage according to an aspect of the present invention.

The process for performing the multiple contingency analysis is outlined with respect to FIGS. 7b and 7c. The process begins in step 138 of FIG. 7b, where the specific single contingencies that may pose a risk when combined with other single contingencies are identified. Here, a specific total combined exhaustion X % of reactive reserves drained is determined for a specific number N of agents. For example, 35% of the reactive reserves may be remaining across a number of three agents. If this exhaustion is less than a predetermined number, X %, then the single contingency is held in a pool for double contingency analysis. With reference to FIG. 7c, a growth is shown depicting the exhaustion of reactive reserves against the number of agents chosen. The line represents X % as distributed across the number of agents N. Since X % represents the severity of an effect and N represents the magnitude of geographic impact, a skilled artisan can adjust the number of agents and percent of reactive reserves remaining to highlight the region of interest. The line can be defined as a breaking point as to when a particular single contingency will be included in double contingency analysis. In FIG. 7c, single contingencies falling to the lower left of the line would not be considered while contingencies falling to the upper right of the line would be considered for double contingency analysis. This procedure uses N>1 selected outages that affect more than one agent in a family line and possibly more than one family. This procedure captures the divide and conquer aspects of how outages cause local blackout, voltage collapse or voltage instability.

Once the single contingency analysis has been performed, each of the single contingencies satisfying the criteria set forth above is simulated in combination with every other single contingency that satisfies the criteria in step 139; any double contingency for which no load flow solution can be reached is held for further analysis in step 139a. This process of double contingency analysis results in $M*(M-1)/2$ combinations of single contingencies where M is the number of single contingencies that satisfy the criteria and have load flow solutions.

Figure 8:
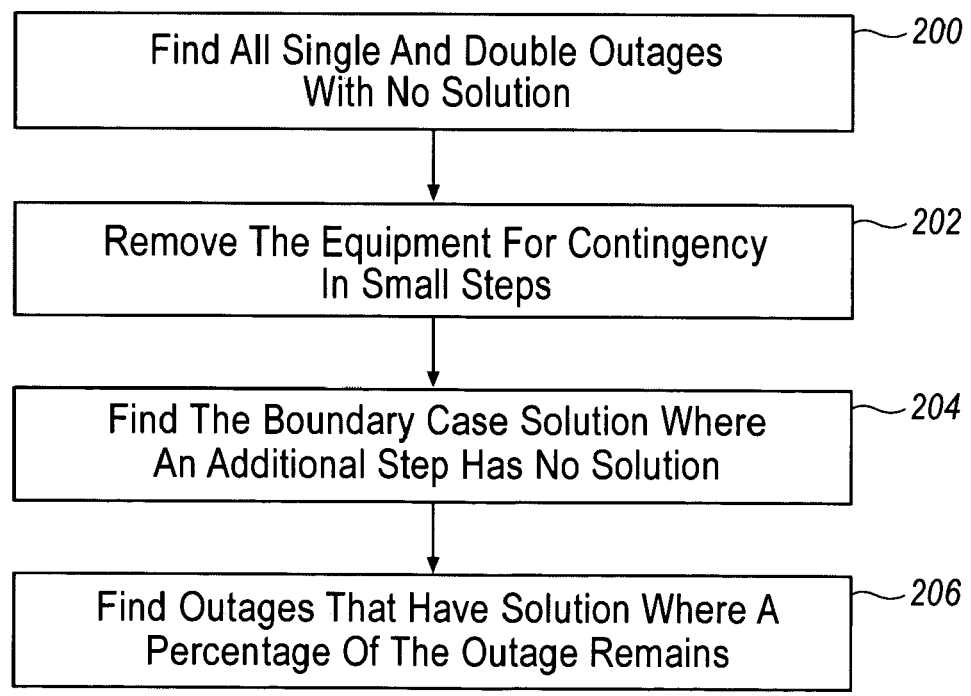
FIG. 8 is a schematic view of an algorithm according to an aspect of the present invention.

Returning now to FIG. 3, in step 37a the boundary case solution is found for each single and double outage without a solution found in steps 133 and 139a of FIGS. 7a and 7b respectively. More specifically, referring to FIG. 8, each non-solving double contingency and each non-solving single contingency found (see step 200) is then simulated by mathematically removing the equipment in small steps in step 202, similar to a "dimmer switch". The "dimmer switch" method herein referred to as the maximum percentage of the outage seeks the threshold of equipment outage (boundary case solution) beyond which no load flow solution exists as in step 204. The purpose of simulating an outage incrementally is to obtain load flow solutions that could not otherwise be found if the outage was taken in one step and to identify the impact of the outage from the boundary case solution on agents at the threshold of voltage collapse. The desired result of determining the impact of the double contingency on agents is to define the predicted control region that may be composed of agents in one or more family lines in one or more families.

Once the single and double contingency analysis is performed and the maximum percentage of the outage for each contingency has been identified in step 206, the flowchart depicted in FIG. 6 is used to determine the agents where control is performed in step 38 of FIG. 3. In step 38, if the agents are assessed according to the total exhaustion of the reactive reserves, then control actions such as voltage rescheduling, active rescheduling and load shedding will be performed according to the agent severity rankings. The agents with the greatest exhaustion of reserves for each contingency are identified as the predicted control region for that contingency. A specific example is set forth below.

EXAMPLE 1

By way of a non-limiting hypothetical example, the above-described process is explained in conjunction with an example based on the Tables set forth below. In Table 1, the leftmost column identifies each specific bus of an area in the determined buffer zone in the electrical power system that is under study. The middle column in Table 1 defines the actual loads on the respective buses listed in the Table. The rightmost column defines the reactive reserves or generators that are depleted at the point of maximum load for the specific bus using a stress test such as a VQ curve. For the purpose of this example, reactive reserves are listed only as generators. The generators referenced in the Table correspond to the generators listed in FIG. 5.

TABLE 1

Reactive Reserves of buses

| Bus # | Real Load (MW) | Gens Exhausted |
|---|---|---|
| 1 | 15 | A |
| 2 | 0 | B |
| 3 | 0 | B |
| 4 | 100 | A, C |
| 5 | 0 | A, B |
| 6 | 0 | A |
| 7 | 10 | A, B, C |
| 8 | 30 | B, D |
| 9 | 40 | B, D |
| 10 | 200 | E |
| 11 | 0 | B, D, E |
| 12 | 10 | A |

The results in Table 1 above are used to group buses into agents as shown in Table 2 by finding buses that exhaust exactly the same set of generators at the point of maximum load for the bus.

TABLE 2

Reactive Reserves of Agents

| Agent Number | Buses Included | Shared Generators | Load on Agent (MW) |
|---|---|---|---|
| 1 | 7 | A, B, C | 10 |
| 2 | 4 | A, C | 100 |
| 3 | 1, 6, 12 | A | 25 |
| 4 | 5 | A, B | 0 |
| 5 | 2, 3 | B | 0 |
| 6 | 8, 9 | B, D | 70 |
| 7 | 11 | B, D, E | 0 |
| 8 | 10 | E | 200 |

Each generator is defined as shown in Table 3 according to its Qgenbase, Qmax and Qmax-Qgenbase, as is described in the previous sections.

TABLE 3

Base case reactive values of Generators (before Contingency)

| Generator ID | Qgenbase (Mvar) | Qmax (Mvar) | Qmax – Qgenbase (Mvar) |
|---|---|---|---|
| A | 500 | 1000 | 500 |
| B | 0 | 10 | 10 |
| C | 90 | 100 | 10 |
| D | 25 | 100 | 75 |
| E | 50 | 200 | 150 |

Next, all single contingencies are analyzed by sequentially outaging elements such as lines, generators, transformers, and buses to calculate the reserves on generators after an outage has occurred. The results of this analysis for this hypothetical contingency which will be referred to as contingency F are shown in Table 4.

TABLE 4

Effects of a contingency F on the reactive output of generators

| Generator ID | QgenBase (Mvar) | QgenOutage (Mvar) | Qmax (Mvar) |
|---|---|---|---|
| A | 500 | 500 | 1000 |
| B | 0 | 10 | 10 |
| C | 90 | 50 | 100 |
| D | 25 | 100 | 100 |
| E | 50 | 150 | 200 |

The values are then summed for each agent and the exhaustion factor for this hypothetical contingency is then calculated by using the summed values in equation 1 for each agent as shown below.

$$\text{Exhaustion} = \left( \frac{Q\max - QgenOutage}{Q\max - QgenBase} \right) \cdot 100 \quad \text{Eq. 1}$$

The exhaustion factors for each agent are shown in Table 5.

TABLE 5

Exhaustion Factors for Agents for Contingency F.

| Agent Number | Shared Generators | QgenBase (Mvar) | QgenOutage (Mvar) | Qmax (Mvar) | Exhaustion Factor |
|---|---|---|---|---|---|
| 1 | A, B, C | 590 | 560 | 1110 | 105% |
| 2 | A, C | 590 | 550 | 1100 | 107% |
| 3 | A | 500 | 500 | 1000 | 100% |
| 4 | A, B | 500 | 510 | 1010 | 98% |
| 5 | B | 0 | 10 | 10 | 0% |
| 6 | B, D | 25 | 110 | 110 | 0% |
| 7 | B, D, E | 75 | 260 | 310 | 21% |
| 8 | E | 50 | 150 | 200 | 33% |

The agents can then be assessed according to exhaustion factor at shown in Table 6.

TABLE 6

Table of Agents Assessed on Exhaustion Factor for the Contingency F

| Agent Number | Exhaustion Factor | Load (MW) | Included Generators |
|---|---|---|---|
| 5 | 0% | 0 | B |
| 6 | 0% | 70 | B, D |
| 7 | 21% | 0 | B, D, E |
| 8 | 33% | 200 | E |
| 4 | 98% | 0 | A, B |
| 3 | 100% | 25 | A |
| 1 | 105% | 10 | A, B, C |
| 2 | 107% | 100 | A, C |

Following the same procedure, another table of data similar to that of Table 6 is defined below in Table 7 for two more hypothetical single contingencies (G and H). The sample exhaustion factors for each are provided and could be derived in a similar manner, but will be omitted to avoid redundancy. Also, data for contingency F is provided from Table 6 for convenience.

TABLE 7

Exhaustion factors for hypothetical single outages F, G and H

| Agent Number | Exhaustion Factor F | Exhaustion Factor G | Exhaustion Factor H | Load (MW) | Included Generators |
|---|---|---|---|---|---|
| 5 | 0% | 60% | 100% | 0 | B |
| 6 | 0% | 50% | 5% | 70 | B, D |
| 7 | 21% | 0% | 5% | 0 | B, D, E |
| 8 | 33% | 30% | 10% | 200 | E |
| 4 | 98% | 100% | 0% | 0 | A, B |
| 3 | 100% | 110% | 20% | 25 | A |
| 1 | 105% | 10% | 40% | 10 | A, B, C |
| 2 | 107% | 20% | 50% | 100 | A, C |

In a realistic study, these exhaustion factors are computed for all single outages within the region of interest, but this example will contain only F, G and H. The skilled artisan will then select values of X % and N indicating that single contingencies which exhaust 100-X % of the reactive reserves of N agents will be considered for double contingency analysis. A sample tool to aide this selection process is defined in Table 8.

TABLE 8

Aid in selecting double contingencies based on the exhaustion factors of single contingencies from Table 7

|  | 1 Agent | 2 Agents | 3 Agents | 4 Agents | 5 Agents |
|---|---|---|---|---|---|
| 0% | FGH | F | | | |
| 10% | FGH | FGH | H | H | |
| 20% | FGH | FGH | FGH | H | H |
| 30% | FGH | FGH | FGH | GH | H |
| 40% | FGH | FGH | FGH | FGH | H |
| 50% | FGH | FGH | FGH | FGH | GH |
| 60% | FGH | FGH | FGH | FGH | GH |
| 70% | FGH | FGH | FGH | FGH | GH |

For the purposes of this example, a tool with N=1–5 and X %=0%–70% in steps of 10% has been provided. It is possible to increase or decrease any or all of these values to create a much larger and more granular set of cells. The outages placed in each cell represent the pool of single outages that would be combined to make double outages if that particular cell is selected. If N=3 agents is selected as well as X %=30, then, using Table 8, the single outage pool would consist of the set {F,G,H}. These are then combined to create all possible combinations M*(M−1)/2. In this case M=3, so the number of combinations is 3, namely FG, FH and GH. In this example, these three double contingencies will be simulated. In a more realistic example there would be hundreds or thousands of single outages in each cell, but this example only shows a trivial number. The procedure for a particular X % and N selection will not in general find all double outages that have no solution. Increasing X and decreasing N to cause more double outages to be evaluated is one procedure. Another is to perform the step of selecting X and N twice and add the non overlapping outages in the two sets. The second selection might be N=1 when the first selection was n=3. There are several possible methods for determining all the outages have no solution that would be apparent to the skilled artisan.

Once the pool of single and double contingencies has been simulated, those that are determined to be potential causes for voltage collapse, local blackout or voltage instability are identified. One possible way to make this determination is by choosing the set of single contingencies as well as the set of double contingencies that were unable to reach a solution to the load flow equations when the maximum percentage of the outage remaining in the system is equal to zero. Other possible determinations for this measure are available to the skilled artisan.

The set of contingencies that have no solution when simulated as an increasing percentage of the outage is removed are then analyzed at the maximum percentage outage threshold (boundary case solution) to find agents with the largest percentage of their reactive reserves exhausted based on the exhaustion factor in the same manner as that which led to Table 6. This is performed in step 37a. Note that Table 9, which shows the agents assessed based on percentage exhaustion, is the same as Table 6. This may not be the case in reality as single or double outages that have boundary case solution when some percentage of the outage has been removed does not generally to allow the reactive reserves on agents to remain unexhausted in the exact same percentages as a single contingency that has a solution.

Referring to step 38 in FIG. 3, the results of the exhaustion factor ranking are used to identify remedial actions, such as shedding load, adding new generation, rescheduling active power on existing generation or rescheduling voltage for strengthening the electrical power system in critical locations. More specifically, by knowing the specific agents that are the most completely exhausted one can determine the generators where control actions should be taken as well as the specific loads that could be shed to obtain solutions to the load flow equations. For example, from table 9 it can readily be determined that agents 8, 7, 6 and 5 are depleted by a large percent. As such, these agents may be characterized as critical agents and critical agents with buses that have load contained therein may be referred to as load pockets, as the reactive reserves of the agents are depleted beyond a significant amount. The actual amount needed to characterize an agent as a critical agent may be determined arbitrarily depending on system tolerances. For purposes of this example, agents depleted beyond 50% will be considered as critical agents belonging to the predicted control region. However, one skilled in the art will readily recognize that variations from the percentages provided in this application may be chosen to define critical agents.

The order in which control actions are taken for critical agents can be in the assessed order of the exhaustion factors (note that there are different possible methods for computing the exhaustion factors as noted earlier). This could be the order in which the reserves are exhausted. Thus, performing control on agents in this order attempts to obtain solutions on agents in the same order as their exhaustion of reactive reserves or where the impact of the exhaustion is greatest. This procedure works very well as the agents that exhaust first or are impacted greatest cause cascading exhaustion of reserves and presumably instability. Thus, if control can provide reserves on these agents, one has presumably addressed the problem at its source. Another method that can be used is to perform control action at larger agents in family lines with non-zero exhaustion factors as voltage collapse can eliminate the ability to obtain reactive supply to the most impacted agents as determined by exhaustion factor. This method also provides solutions and has been effective when the exhaustion factor ranking method does not obtain solutions. The method uses an exhaustion factor control that increases reserves in the most impacted agents identified by ranking of the exhaustion factors, but would use the additional control in large agents in the different family lines to obtain solutions. Finally one could attempt control in order of the largest to smallest exhaustion factor agents. This process attempts to reverse the cascading rather than track the cascading as in the first method. Other methods of determining the order of agents where control actions are tried as will be determined by the skilled artisan.

TABLE 9

Hypothetical Exhaustion Factors for non-solving double contingency GH b

| Agent Number | Exhaustion Factor | Load (MW) | Included Generators |
|---|---|---|---|
| 5 | 0% | 0 | B |
| 6 | 0% | 70 | B, D |
| 7 | 21% | 0 | B, D, E |
| 8 | 33% | 200 | E |
| 4 | 98% | 0 | A, B |
| 3 | 100% | 25 | A |
| 1 | 105% | 10 | A, B, C |
| 2 | 107% | 100 | A, C |

The associated generators for the critical agents, 5, 6, 7 and 8 are primarily B and D (as well as E). Accordingly, referring to Table 2, we can readily see that buses associated with these particular agents are 2, 3, 8, 9, 10 and 11. However, only buses 8, 9 and 10 have real loads associated with them. As such, one solution to strengthen electrical power system is to shed the loads on these buses in response to this specific contingency in increasing magnitudes until consecutive solutions to the load flow equations are obtained. It is desirable to obtain many consecutive solutions for increasing control changes. Corresponding reductions in generation can be performed by reducing the generation at the swing bus, by governor load flow or by decreasing generation on specific generators such as those where high reactive losses are observed or where reactive output is greatest. However, one skilled in the art may be able to find other suitable methods for selecting generators for reduction. The load pocket of agent 6 may be the control region is if load shedding at buses 8 and 9 in increasing percentages have consecutive solutions. If one can not obtain consecutive solutions, one might select a control region of loadpockets 6 and 8. One can increase the number of load bearing agents in the control region until one obtains consecutive solutions from which a load shedding control is selected as nearer the center of the set of consecutive solutions It is desired to modify the controls of a minimum number of generators. However, a small number may not be sufficient to obtain solutions to the load flow equations. In this case, the number of generators involved can be increased. The process of choosing generators follows the assessed exhaustion of the agents and may give preferential treatment to certain generators, such as those with higher capacities. The above example can be applied to a selection of generators on which voltage rescheduling is performed. Since it is determined that the generators for the most affected agents above are B,D and, to a lesser extent, E, voltage rescheduling would be attempted by increasing or decreasing the voltage setpoint in small steps until several consecutive solutions to the load flow equations are found. The control used should be robust and could be taken at or nearer the center of the consecutive set of solutions. Care is taken with this increase to not violate physical voltage limits of the generators. If voltage is reduced one must monitor reactive reserve in Predicted Control Region agents to see that it is increasing on each agent, if not on every generator. If one generator is desired, we look to the most exhausted agents and find that generators B and D are candidates. However, since generator D has 100 Mvars of capacity and generator B has 10 Mvars, we may select D as belonging to the control region since it has the larger reactive supply capability. If no suitable solutions can be found with one generator, two could be tried. In this case, D and B are selected as belonging to the control region and voltage setpoints are increased on both together or in series until consecutive solutions are obtained. If a third generator is required, E would be selected because it appears in the next most exhausted agent. Voltage Rescheduling could increase the voltage setpoints on all generators in the control region sequentially or simultaneously until voltage limits are reached on a generator, at which point that generator is maintained at its voltage limit.

Active power rescheduling can be performed on generators that are selected by the same method that is used in voltage rescheduling. Active power is reduced on a subset of generators selected so that supply large reactive losses on paths to the load pockets and active power is increased on the remaining generators in the set that supply relatively small reactive losses on paths to the load pocket. The level of transfer is increased progressively until consecutive solutions are obtained for increasing transfer level. The participation factors for this transfer are determined experimentally by determining the incremental change in reactive supply for the same incremental increase in active power or voltage on each generator in the set. The subset of generators that decrease active power in the set of generators being used for control and the subset of generators that experience active power increases depends on which generators have the largest increase in reactive losses and those that have the smallest increase in reactive losses on all generators in the network or the reactive supplied by the specific generator. The participation factors for the subset of generators that have an increase in power to accomplish a particular level of power transfer are proportional to the increase in reactive losses and the participation factors for the subset of generators that decrease generation are based on the reciprocal of reactive losses incurred on the generators. The loading factor for generators in terms of active or reactive power can be used for grouping the generators that have active power generation decrease and those that have active power generation increase and for determining the participation factors for each subset of the generators being used for control in place of reactive losses or reactive generation. The transfer level is increased until consecutive solutions are obtained and a control is used that is nearer the center of the consecutive solution set. Removing active power on these paths with large reactive losses can be quite effective in obtaining loadflow solutions.

A combination of voltage rescheduling and active rescheduling can also be performed. The desire is to use the fewest control actions possible to obtain consecutive solutions for incremental changes in control. It should be noted that voltage decrease on generators with active power decrease and voltage increase on generators with active power increase can even more dramatically reduce reactive losses and obtain loadflow solutions. The coordination of voltage rescheduling control for outages where control is undertaken in different control regions is anticipated since obtaining a solution for outages affecting more than one family line may work well but be deleterious to obtaining solutions for outages affecting more than one family line where one or more family lines overlap. What works well in one control region for the outages where control obtains solutions may complicate obtaining solutions for outages impacting another control region. Coordination of voltage control can be performed so that the controls in the shared family lines can be on active power for one control region and voltage setpoint for the other or a modest change in voltage setpoint that does not cause too much harm for one control region in obtaining solutions and perhaps not too much benefit to the other control region. One can expand the control regions for each set of outages and hopefully overcome the problem in that manner as well. The techniques for active power rescheduling, voltage rescheduling and even load shedding can be performed in various different combinations that are apparent to the skilled artisan In addition to identifying the solutions for one particular contingency, the present invention is directed toward selecting specific contingencies and agents which need to be fortified for proper operation of the voltage control system. The solutions to these specific outages may provide solutions to outages that affect the same agents, family lines and families. The number of outages typically found that have no solution when simulated by removal of the equipment in small steps is large. There can be solutions that require very little control in a very small control region or set. These outages are called parametric outages that suggest that the blackout is not severe as measured by the contingency measure, and if the control change is not large, it can be ignored as a cause of blackout. This is particularly true if one can show that when controls are found in large control regions for a few outages with severe contingency measures, the use of those controls as a posturing control for the system can lead to solutions of all other outages that cause voltage collapse for less severe outages using controls in a subset of the larger control region, one would be developing a posturing control rather than a preventive, corrective and emergency control for each outage that has no loadflow solution. The inventors of the present invention have recognized that the interrelationship between the severity of the outage in producing reactive losses in certain agents and the groups of buses, or agents, and their generators that experience exhaustion of reactive reserves are many times responsible for determining how far the cascading occurs. This would suggest why a posturing control could be successful.

Accordingly, the vulnerability region for an agent can be defined as all of the buses associated with that agent combined with all of the buses associated with all of the children of that agent or with the family of that agent. For example, in the illustration depicted in FIG. 5, the vulnerability region for agent 1, which is the voltage instability regions of all agents in all agents in all family lines leading to that agent, includes all of the buses in agents 1, 2, 3, 4, and 5. Now referring to Table 2, the buses that comprise the vulnerability region for agent 1 are therefore, 1, 2, 3, 4, 5, 6, 7 and 12.

For a large system, however, which may include tens of thousands of buses, agents and generators, determination of the critical agents, vulnerability regions and critical generators is not very easy. Accordingly, determining the correct solution as to which generators, which agents or other components should be fortified may be difficult. Therefore, the inventors of the present invention have determined that the algorithm as set forth below may be used to identify critical contingencies and critical agents.

Eq. 2:
$$Ci = \sum_j \frac{P_j(-1 + \%reactivereservesremaining_{ij})}{1 - \%outageremaining_i}$$

$$A_j = \sum_i \frac{P_j(-1 + \%reactivereservesremaining_{ij})}{1 - \%outageremaining_i} \quad \text{Eq. 3}$$

The numerator of the term being summed is equal to the reactive reserve reduction in agent j due to contingency i and is generally negative but can be positive for agents where the reactive reserves are totally or near totally exhausted either because there is very little reactive supply in the agent or the reactive voltage scheduling causes almost total exhaustion of the reactive reserves. These positive terms have very little effect on a contingency measure that is very negative for the worst outages that exhaust a far larger percentage of the reactive reserves than the percentage of the outage removed that is the denominator of the terms being summed in equations 2 and 3. The outages or contingencies that are most severe quickly exhaust a large percentage of the reactive reserves in several agents for the part of the outage removed and thus the terms being summed can be quite negative for agents affected by the outage i. In Eq. 2, Ci represents the measure ranking of the contingency i, and Pj is the total power generation or load associated with the agents. The load is the preferred implementation since it indicates which agents have load. The agents with no load have no contribution to the contingency measure and have no agent measures. The worst contingencies project a large negative multiple of Pj for the term that is summed on agents.

The measure $A_j$ can be quite positive for some agents indicating where the agents with very little reactive supply or that have very little reactive reserves due to scheduling on generators, voltage setpoint, active power, etc. The cascading instability is expected to be initiated in family lines containing these agents. The agent measures that are very negative are far larger in magnitude than those that have positive magnitude. The agents that have extremely negative measures indicate regions that incur very large reactive losses compared to the reactive reserves associated with the agent and thus quickly cause a lack of solution when a small percentage of the outage is removed. The agents with very negative measures require either more reactive supply through unit commitment changes to match the reactive losses incurred, active power rescheduling and voltage rescheduling to reduce the reactive losses, additional FACTS or switchable shunt capacitors to reduce reactive losses via better voltage control through maintaining reserves and increasing reserves on existing generators in those agents, improved transmission to reduce voltage and phase changes that cause reactive losses, or additional active generation to reduce reactive losses on supply reactive and active power to the agent. The agent with positive reactive values needs more reactive supply and the same type of enhancements may be necessary as are required for agents with very negative measures.

As mentioned, in Eq. 2, Ci represents the measure ranking of the contingency i, and Pj is the total power generation or load associated with the agents. In Eq. 3, Aj is the measure for ranking of the agent j. As such, Ci is used to form a matrix for determining the critical contingency, which is the contingency that has the most dramatic effect on the electrical power system. Aj is used to form a matrix to identify the critical agent that has the most dramatic effect on the electrical power system. The contingency measure and agent measure are proportional to load and thus are an economic measure proportional to dollars lost per blackout or dollars lost for outages that cause blackout due in part to agent j. If the Contingency measure is multiplied by the probability of the outage, one has a risk measure. If the Agent measure, which is summed over the existing consequence measure for the agent for that contingency, is multiplied times the probability of the equipment outage, one has a risk measure for that agent. These economic risk measures could help make decisions on where and when to make enhancements to the system.

An Available Transfer Capability is an active power security constraint that indicates when too much power is being imported into a load bearing agent, a control region or load pocket that is vulnerable to voltage collapse, local blackout and/or voltage instability if pre-specified single and double outages occur. A security constraint is a constraint on the operation of a utility that, if satisfied, will prevent a thermal overload, voltage limit violation, or prevent a voltage instability, voltage collapse or blackout from occurring in response to one or more contingencies.

Each load pocket has its own Available Transfer Capability Security Constraint based on the equipment outages or contingencies that cause it to experience voltage collapse, local blackout, or voltage instability. An Available Transfer Security Constraint is a security constraint that requires that ATC (available transfer capability) for a particular load-pocket is greater than zero.

Rather than attempting to find the security constraint for each equipment outage that can cause voltage collapse, local blackout, or voltage instability, an Available Transfer Capability Security Constraint is computed for the change in flow possible into the load pocket The Available Transfer Capability is obtained from the Total Transfer Capability for the Load Pocket by subtracting the firm and non-firm transfer into the load pocket and the Transmission Reliability Margin and the Capacity Benefit Margin for the load pocket. Capacity Benefit Margin is the amount of transmission transfer capability reserved by load serving entities to ensure access to generation from interconnected systems to meet generation reliability requirements (in case generation is lost in the load serving entity, it can obtain power from other generation in the utility or outside the utility). A Transmission Reliability Margin is the amount of transmission transfer capability necessary to ensure that the interconnected transmission network is secure under a reasonable range of uncertainties and system conditions.

These ATC constraints for each load pocket are easily incorporated in the Security Constrained Dispatch and Security Constrained Unit Commitment that computes Locational Marginal Prices for each hour of the day for the Day Ahead Market. The Available Transfer Capability could be computed and updated hourly and used in the Hour Ahead Market and used to compute an hourly updated Locational Marginal Price for congestion for each voltage collapse load pocket. The congestion prices can provide incentives for customers of the transmission system to commit additional generators in load pockets that are experiencing congestion, increasing generation on existing generators in the load pockets, installing additional lines into the load pocket, installing additional generation in the load pocket, or adding FACTS or Special Protection Control for relieving congestion of the load pocket. The Preventive Voltage Rescheduling, Preventive Active Rescheduling and preventive load shedding can increase ATC and thus eliminate the congestion and possibly the need for adding generation, transmission capacity, FACTS, or Special Protection Control for any load pocket. The Voltage Collapse Diagnostic and Preventive Control indicates the single and single outage components of double outages that could cause blackout for each control region, the control region set of agents where Preventive Control Load Shedding Control can prevent the blackouts for these outages, the control region where an incremental increase in load can cause blackout in that control region, which can be used to compute the Incremental Transfer Capability (TTC) for the control region or load pocket. The Incremental Transfer Capability (ITC) for the control region is the minimum increase in transfer (load minus generation) into that control region after any single contingency from the set of component single contingencies that in combination cause blackout in that control region. The Control Region is chosen for computing the Incremental Transfer Capability because the Preventive Load Shedding Control performs load shedding in those agents of the control region to obtain load flow solutions for the double equipment outage combinations of the single outages used to compute the Incremental Transfer Capability. The Total Transfer Capability for the control region is the Incremental Transfer Capability for the control region plus the existing load minus the generation within the control region. The Non-Recallable Available Transfer Capability (NRATC) is then the Total Transfer Capability minus the Transmission Reliability Margin (TRM) minus the firm transmission reservation for that control region. The Recallable Transfer Capability is the Total Transfer Capability minus a percentage of the Transmission Reliability Margin, the firm transmission reserved for that Control Region, and the non-firm transmission reserved for point to point transfer into that control region.

The single outages that are components of double equipment outages that cause voltage collapse and that are corrected via control in a particular control region (problematic contingencies) are the outages required to compute ATC for that control region or load pocket. There are two methods to calculate the ATC value for a particular control region and both must use the results from Voltage Collapse Diagnostic and Preventive Control. One method is used when only double contingencies and no single outages can cause blackout in the control region and the second method is used when single outages cause blackout in the control region. The second method has precedence on control regions where there are one or more single outages that cause voltage collapse, local blackout. The first and most straightforward approach involves finding Preventive Load Shedding Controls for all equipment outages that were unable to reach a maximum percentage of the outage remaining in the network equal to zero. These, as explained previously, are the equipment outages that will cause voltage instability, local blackout, or voltage collapse in the electrical system. It is important to note that the preventive loadshedding control may require multiple loadbearing agents or loadpockets to reach a suitable remedial action for a problematic contingency and also that each problematic contingency may requires a different amount of load shedding on either the same, a similar or a completely different set of agents. An example calculation for double contingencies is set forth below.

EXAMPLE 2

Referring now to the tables illustrated below, a hypothetical non-limiting example is illustrated that will use the agents as defined in Table 2 and diagrammed in FIG. 5 as well as a set of single contingencies that are defined by the letters A–F as discussed above. Each letter represents a single contingency or piece of electrical equipment that can be switched off and effectively removed from the electrical system. This example asserts that the (1) Voltage Collapse Diagnostic is performed as outlined in previous sections to obtain the agents from Table 2 and FIG. 5, (2) single contingency analysis is performed to find if any single outages cause voltage collapse and find those outages that are used to find the double outages that will be simulated, (2) double contingency analysis is performed for determining the set of double outages to be simulated by selecting X and N and by simulation of the resulting set of single outage combinations. A full discussion of this procedure is outlined in the previous sections.

The double outages that have no solution when simulated by removing the equipment in one step and in several small steps are saved and used to compute ATC (available transfer capability) for each control region. From this analysis, it is determined that the following combinations of double contingencies do not reach solutions to the load flow equations when the maximum percentage of the outage remaining in the network is equal to zero and are thus problematic contingencies. The combinations are: {A,C}, {A,D}, {B,D}, {C,D} and {C,E}.

Next, loadshedding preventive controls are sought using the procedure outlined above referencing Table 6. After one or more attempts at loadshedding solutions, suitable values for loadshedding control are reached. The percentages of load shed at each agent for each contingency are enumerated in Table 10. This example assumes that generation is decreased at the swing bus or at generators outside the control region using the Preventive Load Shedding Control. If the Preventive Load shedding Control decreases load in the control region, this decrease in generation would need to be subtracted from the Incremental Transfer Capability for a control region computed in this example.

|  | {A, C} | {A, D} | {B, D} | {C, D} | {C, E} |
|---|---|---|---|---|---|
| Agent 1 | 0 | 25 | 10 | 5 | 0 |
| Agent 2 | 0 | 25 | 10 | 5 | 0 |
| Agent 3 | 0 | 25 | 10 | 5 | 25 |
| Agent 4 | 0 | 0 | 0 | 0 | 0 |
| Agent 5 | 0 | 0 | 0 | 0 | 0 |
| Agent 6 | 20 | 25 | 10 | 0 | 0 |
| Agent 7 | 0 | 0 | 0 | 0 | 0 |
| Agent 8 | 20 | 25 | 10 | 5 | 0 |

Table 10 represents the Percentage Load Shed on Each Agent that Is Required in order to reach a solution to the load flow equations for each hypothetical problematic double contingency.

Each column in Table 10 represents a set of load pockets in a control region where Preventive Load Shedding Control was successful in reducing stress on the electrical system with respect to that particular double contingency. As such, it stands to reason that, if only one component was outaged, the stresses produced by the other component may be reproducible by increasing load on the set of load pockets that were stressed due to the original outage combination. Load stress is applied in the control region agents for each double equipment outage shown in Table 10 after removal of one component of each problematic double contingency and then again after removal of the second component of that same problematic double contingency. The procedure for one problematic double contingency is described below.

The control region set of load pockets for contingency {A,C} as defined by Table 10 is agents 6 and 8 and the components of the double contingency are A and C. The buses associated with agents 6 and 8, as defined by Table 2, are 8, 9 and 10. An artificial stress, as defined below, is applied to these buses by scaling the load at these buses in steps of increasing percentage while simultaneously outaging one component A. The percentage increase in load that can be added to these buses while still reaching a solution to the load flow equations, translated into the actual MW change, is equal to the incremental transfer capability value for contingency A and load pocket set 6 and 8. For the purposes of this example, this percentage is 30% which translates to an Incremental Transfer Capability for control region composed of agents 6 and 8 for outage A of 81 MW. Similarly, the set of load pockets is subjected to the same increasing pattern of stresses while simultaneously outaging component C to result in the incremental transfer capability of component C and load pocket set 6 and 8, which in this example is 25% which translates to an Incremental Transfer Capability for control region composed of agents 6 and 8 for outage C of 67.5 MW. These two values are presented along with others in Table 11.

Repeating this procedure for each problematic double contingency will result in measures for each respective set of load pockets for each respective contingency component, the hypothetical results of which are outlined in Table 11 ture of ITC (incremental transfer capability) for all of the outages that cause blackout on a control region set of load pockets.

Using Table 11, all prospective incremental transfer capabilities are listed. The table shows each percentage of increased load is required to reach the boundary case solution for each load pocket and single contingency. There are two applications for Table 11. The first is to find the minimum percentage change in load that can be added in a particular control region set of load pockets in combination with any single contingency that will result in no solution to the load flow equations. Since the control region loading pattern is the same for problematic double contingencies {A,D} and {B,D}, there are three independent percentages of increased load associated with three single contingencies, A, B and D. These three values can be used to calculate Incremental Transfer Capability for the set of load pockets described by 1,2,3,6 and 8 by finding the minimum value which in this case is 15% (that translates to a 405×15%=60.75 MW value of ITC for that control region). Column "A of {A,D}" shows that a 15% increase in load will result in load flow non-solution when taken in combination with outage A. If an increase in load greater that 15% occurs, and contingency A unexpectedly is outaged due to equipment failure, maintenance, or other reason, the electrical system would be anticipated to experience voltage stability, local blackout or voltage collapse problems. The same procedure is applied to every unique control region set

|  | A of {A, C} | C of {A, C} | A of {A, D} | D of {A, D} | B of {B, D} | D of {B, D} | C of {C, D} | D of {C, D} | C of {C, E} | E of {C, E} |
|---|---|---|---|---|---|---|---|---|---|---|
| Agent 1 |  |  | 15 | 19 | 120 | 19 | 20 | 45 |  |  |
| Agent 2 |  |  | 15 | 19 | 120 | 19 | 20 | 45 |  |  |
| Agent 3 |  |  | 15 | 19 | 120 | 19 | 20 | 45 | 80 | 80 |
| Agent 4 |  |  |  |  |  |  |  |  |  |  |
| Agent 5 |  |  |  |  |  |  |  |  |  |  |
| Agent 6 | 30 | 25 | 15 | 19 | 120 | 19 |  |  |  |  |
| Agent 7 |  |  |  |  |  |  |  |  |  |  |
| Agent 8 | 30 | 25 | 15 | 19 | 120 | 19 | 20 | 45 |  |  |

Table 11 is the Largest percentage of increase in agent load in combination with a single outage that was able to obtain load flow solutions. The artificial stresses that are applied could be a Q-V style loading, a P-V style loading or an S-V style loading simulated via a governor loadflow that simulates the generation response in the system due to load reduction. The preferred embodiment uses P-V, or real load increase to simulate the stress because an ATC is desired that can be expressed in active power change across a control region boundary that can be incorporated in a dc loadflow based Security Constrained Unit Commitment or a Security Constrained Dispatch. If one used Q-V or S-V curves to determine Incremental Transfer Capability, a very different ATC measure is produced for any Control Region. The stress is applied incrementally to all agents in the stressed control region until there is no solution to the loadflow equations for every equipment outage that is a component of a double outage that has a solution through Load Shedding Control in that Control Region. One could also add load to the vulnerability regions of agents 6 and 8 (the specific buses within agents that are substantially exhausted in the control region for the contingency) and not to the load pockets (agents) themselves to produce possibly a slightly more robust pic- of load pockets to derive a similar incremental transfer capability for each control region set of load pockets.

Another measure of Incremental Transfer Capability is based on single load pockets rather than control regions. Despite the fact that a load flow non-solution obtainable by exhausting reactive supply on a single agent or by adding load on a single agent in combination with a single contingency, the minimum addable load found in each row of Table 11 can be considered a measure of incremental transfer capability for that individual load pocket when it is understood that such an ITC is evaluated for every load pocket in the system. The Table shows the load increase in a specific load pocket that could cause voltage instability that if accompanied by load increase in other loadpockets would produce voltage instability in some control region. In the case of agent 8, this value can be observed to be 15% (that translates to 30 MW referring to Table 2) and is the minimum percentage across the agent 8 row in Table 11.

A similar measure of reliability can be determined for the case when the Voltage Collapse Diagnostic procedure has determined that there are single contingencies that are unable to reach a load flow solution when the maximum percentage of the outage remaining in the system is equal to zero. This indicates that the power system is vulnerable to collapse in the event of a single contingency, which is considered an emergency situation. In such a critical situation, it is desirable to have a method of finding the geographic locations of the power system that are most vulnerable to collapse as a result of the single contingency. The single contingency ATC procedure outlined in Example 3 can determine the amount of loadshedding in a control region or in specific load pockets which will avert the emergency and restore normal operating conditions.

EXAMPLE 3

This hypothetical non-limiting example will also use the agents as defined in Table 2 and diagrammed in FIG. 5 as well as a set of single contingencies that are defined by the letters A–F. As in Example 2, each letter represents a single piece of electrical equipment that can be switched off and effectively removed from the electrical system. These single contingencies are intended to be a set independent of those in Example 2. This example asserts that the Voltage Collapse Diagnostic is performed as outlined in previous sections to obtain the agents from Table 2 and FIG. 5 and single contingency analysis is performed. From this single contingency analysis, it is determined that the single contingencies represented by the set A, C and E do not reach solutions to the load flow equations when the maximum percentage of the outage remaining in the system is equal to zero and are thus problematic single contingencies. Preventive Loadshedding Control is then performed on these single outages similarly to those in Example 2. The results of suitable hypothetical loadshedding are shown in Table 12.

|  | Contingency A | Contingency C | Contingency E |
|---|---|---|---|
| Agent 1 |  |  |  |
| Agent 2 |  |  |  |
| Agent 3 | 45 |  | 50 |
| Agent 4 |  |  |  |
| Agent 5 |  |  |  |
| Agent 6 |  | 16 | 50 |
| Agent 7 |  |  |  |
| Agent 8 |  | 16 |  |

Table 12—Percentage Load Shed on Each Agent that Is Required in order to reach a solution to the load flow equations for each hypothetical problematic single contingency.

From the results in Table 12, it can be observed that a 45% reduction of load in agent 3 will obtain a loadflow solution to contingency A. Similarly, 50% load reduction in agents 3 and 6 will also obtain a solution for contingency E (50 MW). This is the ITC value for one control region of 6 and 3. A 16% load reduction in agents 6 and 8 will obtain a solution for contingency C. The ITC for the control region of 6 and 8 is 16% of the total load in the control region loadpockets 6 and 8 and is 43.5 MW. The ITC for the control region of agent 3 is 45%(75)=30 MW. The ITC is thus computed by control region. The results show one of the issues is that the control regions for single outages may not be Control regions for double contingencies. The ITC values are negative rather than positive for the case where there are no single outages that have no loadflow solution when the maximum percentage of the outage remaining in the network is Zero.

The ITC can be computed for agents rather than control regions by taking the maximum percentage change in Table 12 for any load pocket that has no zero rows in the Table to determine the percentage change in load corresponding to any load pocket where load shedding is needed to obtain a solution for any single outage. When ITC is computed for every load pocket in a control region for every single outage and ITC is the maximum load shed in each load pocket for all single outages that have that load pocket in its control region, the ITC values for all load pockets shouldassure stability for all single outages that have no loadflow solution. To assure that the electrical system will be stable if either contingency C or contingency E occurs, a skilled operator would shed 50% of the load in agents 3 and 6 and expect that either contingency A or E could occur, and the electrical system would not experience voltage instability, voltage collapse or local blackout. Similarly, if 50% of the load is shed in agents 3 (12.5 MW) and 6 (37.5 MW) as well as 16% (32 MW) in agent 8, a skilled operator would expect that the electrical system would be unaffected by voltage instability in the event any single contingency A, C or E occurred. Since it was previously determined that these single contingencies were the only single contingency threats to voltage instability, the above mentioned shedding schedule is expected to posture the electrical system against voltage instability for any single contingency. The negative value of the active power values in MW (that correspond to percentage values in Table 12) for each loadpocket are defined as the Incremental Transfer Capability for that load pocket for the set of single contingencies.

The procedure for computing TTC and ATC from ITC for a control region is

TTC = ITC + net flow into the control region
NATC = TTC − TRM − NRES
RATC = TTC − a TRM − NRES—RRES       a < 1 when the control region set of loadpockets is used to compute Recallable ATC and Non Recallable ATC. If there are no single outages then ITC is positive for all control regions and TTC is positive for all control regions. ATC values depend on the firm(NRES) and non-firm(RRES) reservations for transfer into the control region. If ITC is negative for control regions that prevent blackout for one or more of the single outages, it does not necessarily imply TTC is negative and ATC is negative but would if the flow over the control region boundary equals the firm (NRES) and non-firm (RRES) transfer for the control region. If ATC is computed on load pockets, the ITC values in MW, flow into the load pocket, TRM, RRES, and NRES are load pocket values and not control region values.

The ATC is determined by increasing load through a conformal scaling within the load pocket and computing using a governor loadflow response of generation in the region of interest. This governor loadflow permits computing the power imported across the boundary of the load pocket boundary for each of the single equipment outages identified as being a component of a double outage that has no solution without the preventive control in that control region. The Incremental Transfer Capability is the minimum of the total net import across the boundary of the load pocket after each of these single outages if there is no single outage that can cause voltage collapse in that loadpocket. The Total Transfer Capability adds the Incremental Transfer Capability and the base case or current import across the boundary of the load pocket and is positive. The Total Transfer Capability is negative for control regions where single equipment outage can cause voltage collapse and the firm and non-firm transfer reservation equals the actual import into the loadpocket. The negative value of ITC measures the total transfer reduction into the control region or load pocket to allow the worst single equipment outage that causes voltage collapse in that control region or load pocket to obtain a loadflow solution. This value of the negative ITC for each single outage with no loadflow solutions is computed from the Preventive Load Shedding control for each single outage that causes voltage collapse in that control region.

Once the VCD determines all of the single and double outages that cause voltage collapse and the preventive load shedding control finds the control regions for all of the single and double outages, the particular single and double outages where PC arrest blackout via load shedding in that load pocket are known and the single outages that are components of these double outages are known. The positive value Incremental Transfer Capability for any of the control regions can be determined by computing a P-V curve by increasing the load into the control region or load pocket until no governor load flow solution exists for the load flow equations after each single equipment that is a component of the double outages that cause voltage collapse on that load pocket. The minimum value of transfer of power into the control region for all of these P-V curves is the Incremental Transfer Capability for the control region. The Available Transfer Capability is then computed by adding the current power flow into the control region and subtracting the current net firm and non-firm transfer reservations into the control region plus a Capacity Benefit Margin for providing power to Load Serving Entities and a Transmission Reserve Margin for assuring that there is transmission capacity for variation in the network and generation response to the load change. The Available Transfer Capability is a measure of the reserves available in that control region before voltage collapse, local blackout, or voltage instability will occur.

Depending on the amount of available transfer capability of the load pocket, the load pocket may be characterized in different ways. The first type of load pocket is an active load pocket, which is vulnerable to single outages. Such a load pocket is in a critical state and immediate response is needed. A second type of load pocket is referred to as a vulnerable load pocket. Such a load pocket is not vulnerable to single outages as it does have some capacity, which may be capacity that may be overbooked. A third type of load pocket is an emergent load pocket, which may require double or more outages before any constraints are obtained.

The second step is to compute TRM and CBM for each load pocket or control region. The identification of paths with significant reactive losses can be identified from the Preventive Control algorithm and is important because these reactive losses can greatly change the nose of the P-V curve and the value of ITC. Computing TRM may reflect the difference between the best and worst methods of importing active and reactive power into the control region or load pocket. Once this is obtained, a third step is to specify the net importance and the possible variation of the imports of power into the control region, the various change in the load variation, and the various changes in the network impedances and admittances that may have affect on the P-V curve computed by the governor loadflow. These variations are needed to compute the Transmission Reliability Margin. The Capacity Benefit Margin is that capacity of the boundary of the loadpocket reserved for use by Load Serving Entities. This CBM measure may be discontinued as a separate component in ATC and incorporated in NRES for TRM if FERC Standard Market Design is approved. The CBM is generally computed using a generation reliability method that would be applied to the control region or loadpocket.

What is claimed is:

1. A voltage collapse diagnosis method for an electrical power system including a transmission system and a distribution system, comprising:
    defining a plurality of buses and a plurality of sources of reactive reserves in the electrical power system as a plurality of agents;
    identifying an exhaustion for each of the agents in response to applying at least one contingency to the electrical power system; and
    creating a hierarchical organization arranged from those of the agents remote from the transmission system to others of the agents at the transmission system by defining the ones of the reactive reserves involved in the exhaustion for each of the agents and arranging each of the agents into a family line within the hierarchical organization wherein the respective agents in each respective family line are supported by at least one identical source of reactive reserves.

2. The voltage collapse diagnosis method according to claim 1, further comprising:
    selecting the plurality of buses in the electrical power system to be defined as the plurality of agents;
    wherein the plurality of buses selected in the selecting step are defined by a buffer zone.

3. The voltage collapse diagnosis method according to claim 2, wherein at least one of the plurality of buses in the buffer zone has a real load.

4. The voltage collapse diagnosis method according to claim 2, wherein the buffer zone includes at least one bus located in a sub transmission or distribution level in the electrical power system.

5. The voltage collapse diagnosis method according to claim 4, wherein the at least one bus is at a distribution voltage level.

6. The voltage collapse diagnosis method according to claim 1, wherein the electrical power system is a model of an existing electrical power system and the contingency is a simulated contingency.

7. A voltage collanse diagnosis method for an electrical power system, comprising:
    defining a plurality of buses and a plurality of reactive reserves in the electrical power system as a plurality of agents; and
    identifying an exhaustion for each of the agents in response to applying at least one contingency to the electrical power system wherein the agents are defined such that each subset of agents is supported by similar reactive reserves; and wherein the identifying step comprises:
    applying a load to each of the plurality of buses;
    monitoring a power output from each of the plurality of reactive reserves in response to the load applied to each of the plurality of buses;
    identifying any of the plurality of reactive reserves that become about completely exhausted when a load flow algorithm calculated in conjunction with the applying step for each of the plurality of buses fails to solve; and
    defining the plurality of agents according to the plurality of buses and reactive reserves such that each agent contains buses that exhaust a same set of reactive reserves when a load flow algorithm fails to solve for the buses of the respective agent;

wherein the same set of reactive reserves that exhaust for each agent are defined as a reactive reserve zone for each agent; and wherein a plurality of reactive reserve zones exists for the plurality of agents.

8. The voltage collapse diagnosis method according to claim 7, wherein:

the load applied in the applying step is a simulated load;
the reactive reserves are simulated reactive reserves; and
the electrical power system is a model of an existing electrical power system.

9. The voltage collapse diagnosis method according to claim 7, further comprising organizing the plurality of agents into a hierarchy based on the plurality of reactive reserve zones.

10. The voltage collapse diagnosis method according to claim 9, wherein agents at a higher level in the hierarchy include more reactive reserves than agents at a lower level in the hierarchy.

11. The voltage collapse diagnosis method according to claim 10, wherein agents at a higher level in the hierarchy are at a higher voltage level than agents at a lower level in the hierarchy.

12. The voltage collapse diagnosis method according to claim 11, wherein:

at least some of the agents at lower levels in the hierarchy have reactive reserves basins with subsets of reactive reserves contained in reactive reserve zones for agents at higher levels in the hierarchy; and family lines of agents are defined based on agents at lower levels in the hierarchy having subsets of reactive reserves contained in agents at higher levels in the hierarchy.

13. The voltage collapse diagnosis method according to claim 7, wherein the step of identifying an exhaustion of the each of the agents further comprises:

applying a single contingency to the electrical power system; and monitoring a change in power output of the reactive reserves.

14. The voltage collapse diagnosis method according to claim 13, wherein the step of identifying an exhaustion of each of the agents further comprises:

calculating an exhaustion factor for each agent for each single contingency; and ranking each of the agents according to a respective exhaustion factor. calculated in the calculating step.

15. The voltage collapse diagnosis method according to claim 14, wherein the exhaustion factor for each agent is calculated based on:

$$\text{exhaustion factor} = \left( \frac{Q\text{max} - Q\text{genOutage}}{Q\text{max} - Q\text{genBase}} \right) \cdot 100$$

wherein Qmax is a maximum power generated the reactive reserve zone for each agent, QgenOutage is power generated by the reactive reserve zone for each agent in response to the contingency, and QgenBase is a base power output generated by the reactive reserve zone for each agent.

16. The voltage collapse diagnosis method according to claim 14, further comprising:

selecting a number of agents;

determining a threshold value by multiplying exhaustion factors for each of number of agents times the number of agents for each single contingency;

identifying each single contingency is that results in the threshold value being above a predetermined amount; and performing a multiple contingency analysis with each single contingency identified in the identifying each single contingency step.

17. The voltage collapse diagnosis method according to claim 16, wherein the multiple contingency analysis comprises:

applying combinations of each single contingency identified in the identifying each single contingency step to the electrical power system; and monitoring a change in power output of the reactive reserve zones for each of the agents.

18. The voltage collapse diagnosis method according to claim 17, wherein the step of determining an exhaustion of each agent further comprises;

calculating an exhaustion factor for each agent for each of the combinations of each single contingency; and ranking each of the agents according to the exhaustion factor calculated for each of the agents for each single contingency and each of the combinations of each single contingency.

19. The voltage collapse diagnosis method according to claim 18, wherein the exhaustion factor for each agent is calculated based on:

$$\text{exhaustion factor} = \left( \frac{Q\text{max} - Q\text{genOutage}}{Q\text{max} - Q\text{genBase}} \right) \cdot 100$$

wherein Qmax is a maximum power generated the reactive reserve zone for each agent, QgenOutage is power generated by the reactive reserve zone for each agent in response to the contingency, and QgenBase is a base power output generated by the reactive reserve zone for each agent.

20. The voltage collapse diagnosis method according to claim 19, further comprising:

determining preventive measures to support power flow on the electrical power system based on the ranking of each single contingency and each of the combinations of each singlecontingency.

21. The voltage collapse diagnosis method according to claim 20, further comprising a means for determining and executing the preventive measures.

22. The voltage collapse diagnosis method according to claim 20, wherein the preventive measures include shifting load, adding new generation, rescheduling active power on-existing reactive reserves or rescheduling voltage for strengthening the electrical power system in critical locations.

23. The voltage collapse diagnosis method according to claim 7, wherein the step of identifying an exhaustion of the each of the agents further comprises:

applying a plurality of contingencies to the electrical power system; and monitoring a change in power output of the reactive reserve zones for each of the agents.

24. The voltage collapse diagnosis method according to claim 23, further comprising the step of ranking the plurality of contingencies in order of most critical contingencies.

25. The voltage collapse diagnosis method according to claim 24, wherein the step of ranking the plurality of contingencies is calculated according to:

$$Cj = \sum_j \frac{P_j(-1 + \%reactivereservesremaining_{ij})}{1 - \%outageremaining_i};$$

wherein $C_i$ is a measure ranking of a contingency i:

$P_j$ is a total power generation or load associated with each of the agents j affected by contingency i;

% outageremaining$_i$ is a fractional percentage of contingency i that is remaining at the time of the calculation; and % reactivereservesremaining$_{ij}$ is the fractional percentage amount of reactive reserves remaining in each of the agents j affected by removal of the fractional percentage of contingency i.

26. The voltage collapse diagnosis method according to claim 23, further comprising the step of ranking the agents in order of most critical agents based on the plurality of contingencies.

27. The voltage collapse diagnosis method according to claim 25, wherein the step of ranking each of the agents is calculated according to:

$$A_j = \sum_i \frac{P_j(-1 + \%reactivereservesremaining_{ij})}{1 - \%outageremaining_i};$$

wherein $A_j$ is a measure ranking of the agent j;

$P_j$ is a total vower generation or load associated with each of the agents j affected by contingency i;

% outageremaining$_i$ is a fractional percentage of contingency i that is remaining at the time of the calculation; and % reactivereservesremaining$_{ij}$ is the fractional percentage amount of reactive reserves remaining in each of the agents j affected by removal of the fractional percentage of contingency i.

28. The voltage collapse diagnosis method according to claim 17, further comprising the step of determining an available transfer capability for each of the combinations of each single contingency and a control region or load pocket.

29. The voltage collapse diagnosis method according to claim 28, wherein the step of determining an available transfer capability comprises:

identifying each of the combinations of each single contingency wherein a corresponding load flow algorithm fails to solve;

performing load shedding until a load flow solution exists;

determining a remaining amount of reserves available in the combinations of each single contingency before the corresponding load flow algorithm fails to solve; and defining of a remaining amount of reserves as an incremental transfer capability.

30. The voltage collapse diagnosis method according to-claim 29, wherein the step of determining a remaining amount of reserves for the comprises:

applying only one contingency in each one of the combinations of each single contingency;

placing a load on the control region or load pocket to compensate for the application of only one contingency in the applying step; and determining an additional load as the remaining amount of reserves available that can be applied to the control region or load pocket before a load flow algorithm associated with the only one contingency fails to solve.

31. The voltage collapse diagnosis method according to claim 13, further comprising the step of determining an available transfer capability for each single contingency and a control region or load pocket.

32. The voltage collapse diagnosis method according to claim 31, wherein the step of determining an available transfer capability for the comprises:

identifying each single contingency wherein a corresponding load flow algorithm fails to solve;

performing load shedding until each of the corresponding load flow algorithms solves;

determining a remaining amount of reserves available in the combinations of each single contingency before load flow algorithms corresponding to each of the combinations fail to solve; and defining of a remaining amount of reserves as a incremental transfer capability.

33. A method for determining criticality of a plurality of contingencies, comprising:

applying a voltage collapse diagnosis to an electrical power system, wherein a plurality of contingencies are applied to the electrical power system and responses from a plurality of agents are monitored; and ranking the plurality of contingencies according to criticality wherein the step of ranking is performed according to:

$$Cj = \sum_j \frac{P_j(-1 + \%reactivereservesremaining_{ij})}{1 - \%outageremaining_i};$$

wherein $C_i$ is a measure ranking of the contingency i;

$P_j$ is a total power generation or load associated with each of the agents j affected by contingency i:

% outageremaining$_i$ is a fractional percentage of contingency i that is remaining at the time of the calculation; and % reactivereservesremaining$_{ij}$ is the fractional percentage amount of reactive reserves remaining in each of the agents j affected by removal of the fractional percentage of contingency i.

34. A method for determining criticality of a plurality of agents, comprising:

applying a voltage collapse diagnosis to an electrical power system, wherein a plurality of contingencies are applied to the electrical power system and responses from a plurality of agents are monitored; and ranking the plurality of agents according to criticality wherein the step of ranking is performed according to:

$$A_j = \sum_i \frac{P_j(-1 + \%reactivereservesremaining_{ij})}{1 - \%outageremaining_i};$$

wherein $A_j$ is a measure ranking of the agent j;

$P_j$ is a total power generation or load associated with each of the agents j affected by contingency i;

% outageremaining$_i$ is a fractional percentage of contingency i that is remaining at the time of the calculation; and % reactivereservesremaining$_{ij}$ is the fractional percentage amount of reactive reserves remaining in each of the agents j affected by removal of the fractional percentage of contingency i.

35. A method for determining an available transfer capability, comprising:
determining an amount of power that is available for transfer into a load pocket or control area wherein the determining step further comprises:
performing a voltage collapse diagnosis;
identifying contingencies wherein a corresponding load flow algorithm fails to solve;
load shedding at the load pocket or control area until the corresponding load flow algorithm for each of the contingencies solves; and
determining a remaining amount of reserves available for each of the contingencies before the corresponding load flow algorithm fails to solve.

36. The method according to claim 35 further comprising:
calculating firm transfer or firm and non-firm transfer into the load pocket or control area; and
subtracting a Transmission Reliability Margin and a Capacity Benefit Margin from the firm or non-firm transfer.

37. The method according to claim 35 further comprising:
assigning a value to the control area or load pocket based on the amount of power representative of the criticality of the control area or load pocket.

38. The method according to claim 37, further comprising:
determining a value of power based on the value determined in the assigning a value step.

39. A method for determining an available transfer capability, comprising:
determining an amount of power that is available for transfer into a load pocket or control area wherein the determining step further comprises:
identifying combinations of single contingencies wherein a corresponding load flow algorithm fails to solve;
performing load shedding at the load pocket or control area until the corresponding load flow algorithm for each of the combination of single contingencies solves; and
determining a remaining amount of reserves available in the combinations of each single contingency before each corresponding load flow algorithm fails to solve.

40. The method according to claim 39, wherein the step of determining a remaining amount of reserves comprises:
applying only one contingency in each one of the combinations;
placing a load on the control area or load pocket to compensate for the application of only one contingency in the applying step; and
determining an additional load that can be applied to the control area or load pocket before a corresponding load flow algorithm associated with each only one contingency fails to solve.

41. The method according to claim 40, further comprising:
assigning a value to the control area or load pocket based on the amount of power representative of the criticality of the control area or load pocket.

42. The method according to claim 39, further comprising:
assigning a value to the control area or load pocket based on the amount of power representative of the criticality of the control area or load pocket.

43. The method according to claim 42, further comprising:
determining a value of power based on the value determined in the assigning a value step.

* * * * *